US012087199B2

(12) United States Patent
Lee et al.

(10) Patent No.: US 12,087,199 B2
(45) Date of Patent: Sep. 10, 2024

(54) METHOD FOR DRIVING DISPLAY AT MULTIPLE DRIVING FREQUENCIES AND ELECTRONIC DEVICE PERFORMING SAME

(71) Applicant: Samsung Electronics Co., Ltd., Suwon-si (KR)

(72) Inventors: Minwoo Lee, Suwon-si (KR); Kwangtai Kim, Suwon-si (KR); Seungryeol Kim, Suwon-si (KR); Donghyun Yeom, Suwon-si (KR); Seoyoung Lee, Suwon-si (KR); Juseok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/356,766

(22) Filed: Jul. 21, 2023

(65) Prior Publication Data

US 2024/0021128 A1 Jan. 18, 2024

Related U.S. Application Data

(63) Continuation of application No. PCT/KR2022/000751, filed on Jan. 14, 2022.

(30) Foreign Application Priority Data

Jan. 21, 2021 (KR) ........................ 10-2021-0008795

(51) Int. Cl.
*G06F 3/041* (2006.01)
*G09G 3/20* (2006.01)

(52) U.S. Cl.
CPC ......... *G09G 3/20* (2013.01); *G09G 2330/021* (2013.01); *G09G 2340/0435* (2013.01);
(Continued)

(58) Field of Classification Search
CPC ...... G09G 3/00; G09G 3/0416; G09G 3/2096; G09G 5/001; G09G 2320/0686;
(Continued)

(56) References Cited

U.S. PATENT DOCUMENTS 8,711,139 B2 4/2014 Tsuchida et al.
9,066,093 B2 6/2015 Hasegawa et al.
(Continued)

FOREIGN PATENT DOCUMENTS

JP H11168766 A * 6/1999
JP 2010062938 A * 3/2010
(Continued)

OTHER PUBLICATIONS

International Search Report dated Apr. 26, 2022, issued in International Patent Application No. PCT/KR2022/000751.

*Primary Examiner* — Joe H Cheng
(74) *Attorney, Agent, or Firm* — Jefferson IP Law, LLP

(57) ABSTRACT

An electronic device is provided. The electronic device includes a display including an output area divided into a plurality of blocks, a display driving integrated (DDI) circuit configured to drive the display. and a processor electrically connected to the DDI circuit, wherein the processor is configured to obtain information about a content area of the output area, the content area displaying the at least one piece of content, based on the obtained information, classify the plurality of blocks into first group blocks, second group blocks, and third group blocks, and in order to display the at least one piece of content on the display, control the DDI circuit.

20 Claims, 13 Drawing Sheets

(52) U.S. Cl.
CPC ..... *G09G 2354/00* (2013.01); *G09G 2360/18* (2013.01); *G09G 2370/00* (2013.01)

(58) Field of Classification Search
CPC ..... G09G 2330/021; G09G 2340/0435; G09G 2360/16; G09G 2360/18; G09G 2370/00; G09G 2370/09
See application file for complete search history.

(56) References Cited

U.S. PATENT DOCUMENTS

| | | | | |
|---|---|---|---|---|
| 9,239,644 | B2 | 1/2016 | Doi et al. | |
| 9,558,721 | B2 | 1/2017 | Sakariya et al. | |
| 9,607,537 | B2 | 3/2017 | Fleck et al. | |
| 9,613,554 | B2 | 4/2017 | Jang et al. | |
| 10,019,968 | B2 | 7/2018 | Bi et al. | |
| 10,629,131 | B2 | 4/2020 | Wang et al. | |
| 11,462,177 | B2 * | 10/2022 | Han | G09G 3/3275 |
| 11,551,593 | B2 * | 1/2023 | Pyun | G09G 3/006 |
| 11,561,643 | B2 | 1/2023 | Kim et al. | |
| 11,935,447 | B2 * | 3/2024 | Kim | G06F 3/14 |
| 2009/0167781 | A1 * | 7/2009 | Nakata | H04N 1/41 345/545 |
| 2011/0025726 | A1 * | 2/2011 | Tatsumi | G09G 3/2025 345/690 |
| 2015/0124124 | A1 * | 5/2015 | Maeyama | H04N 23/743 348/235 |
| 2015/0358018 | A1 | 12/2015 | Kim et al. | |
| 2016/0180762 | A1 | 6/2016 | Bathiche et al. | |
| 2019/0180695 | A1 * | 6/2019 | Ha | G09G 3/2051 |
| 2022/0114956 | A1 | 4/2022 | Lee et al. | |
| 2022/0148503 | A1 | 5/2022 | Seo et al. | |
| 2023/0087545 | A1 | 3/2023 | Yoon et al. | |

FOREIGN PATENT DOCUMENTS

| | | | |
|---|---|---|---|
| JP | 5012729 | B2 | 8/2012 |
| JP | 5922984 | B2 | 5/2016 |
| JP | 2020-145624 | A | 9/2020 |
| JP | 2020-146624 | A | 9/2020 |
| KR | 10-2014-0015278 | A | 2/2014 |
| KR | 10-2014-0039524 | A | 4/2014 |
| KR | 10-2016-0070445 | A | 6/2016 |
| KR | 10-2016-0080768 | A | 7/2016 |
| KR | 10-2018-0079610 | A | 7/2018 |
| KR | 10-1965079 | B1 | 4/2019 |
| KR | 10-2021-0100491 | A | 8/2021 |
| KR | 10-2022-0007764 | A | 1/2022 |
| KR | 10-2022-0021064 | A | 2/2022 |
| KR | 10-2022-0033615 | A | 3/2022 |
| KR | 10-2022-0068778 | A | 5/2022 |
| KR | 10-2022-0105886 | A | 7/2022 |

* cited by examiner

METHOD FOR DRIVING DISPLAY AT MULTIPLE DRIVING FREQUENCIES AND ELECTRONIC DEVICE PERFORMING SAME

CROSS-REFERENCE TO RELATED APPLICATION(S)

This application is a continuation application, claiming priority under § 365(c), of an International application No. PCT/KR2022/000751, filed on Jan. 14, 2022, which is based on and claims the benefit of a Korean patent application number filed on Jan. 21, 2021, in the Korean Intellectual Property Office, the disclosure of which is incorporated by reference herein in its entirety.

BACKGROUND

1. Field

The disclosure relates to a method of driving a display at multiple driving frequencies and an electronic device for performing the same.

2. Description of Related Art

With the development of information technology (IT), various types of electronic devices, such as smartphones, tablet personal computers (PCs), etc., have been widely distributed. Also, the electronic devices include displays, the sizes of which have been ever increasing.

To increase user convenience and power consumption efficiency of the electronic devices, methods of driving the increased displays by temporally or spatially dividing the displays have been introduced. For example, driving frequencies of the displays may be changed by temporally or spatially dividing the displays. When a driving frequency increases, a screen may be refreshed by a quicker cycle, and a user may experience improved seamless screen displaying, but the load of an electronic device may be increased to some degree, and power consumption may also be increased.

The above information is presented as background information only to assist with an understanding of the disclosure. No determination has been made, and no assertion is made, as to whether any of the above might be applicable as prior art with regard to the disclosure.

SUMMARY

When a driving frequency is to be suddenly temporally changed, or each of adjacent areas of a display is to be driven at respective greatly different driving frequencies, optical characteristics of the display may become changed, and a user may feel visual inconvenience. Specifically, when two adjacent areas of the display are driven at different driving frequencies, the user may feel a sense of difference, as if the display is separated.

However, when the driving frequency is changed with respect to the entire area of the display in order to remove the sense of difference felt by the user, power consumption may be unnecessarily increased, and thus, the efficiency of an electronic device may be decreased.

Aspects of the disclosure are to address at least the above-mentioned problems and/or disadvantages and to provide at least the advantages described below. Accordingly, an aspect of the disclosure is to provide a method of driving a display at multiple driving frequencies and an electronic device for performing the same.

Additional aspects will be set forth in part in the description which follows and, in part, will be apparent from the description, or may be learned by practice of the presented embodiments.

In accordance with an aspect of the disclosure, an electronic device configured to display at least one piece of content is provided. The electronic device includes a display including an output area divided into a plurality of blocks, a display driving integrated (DDI) circuit configured to drive the display, and a processor electrically connected to the DDI circuit, wherein the processor is configured to obtain information about a content area of the output area, the content area displaying the at least one piece of content, based on the obtained information, classify the plurality of blocks into first group blocks at least partially overlapping the content area, second group blocks not overlapping the content area and not adjacent to the first group blocks, and third group blocks positioned between the first group blocks and the second group blocks, and in order to display the at least one piece of content on the display, control the DDI circuit to drive a first area of the output area, the first area corresponding to the first group blocks, at a first driving frequency, drive a second area of the output area, the second area corresponding to the second group blocks, at a second driving frequency, and drive a third area of the output area, the third area corresponding to the third group blocks, at a third driving frequency, which is a medium frequency of the first driving frequency and the second driving frequency.

In accordance with another aspect of the disclosure, a method, performed by an electronic device, of displaying at least one piece of content is provided. The method includes obtaining information about a content area of an output area of a display, the content area displaying the at least one piece of content, wherein the output area is divided into a plurality of blocks, based on the obtained information, classifying the plurality of blocks into first group blocks at least partially overlapping the content area, second group blocks not overlapping the content area and not adjacent to the first group blocks, and third group blocks positioned between the first group blocks and the second group blocks, and in order to display the at least one piece of content on the display, controlling a display driving integrated (DDI) circuit to drive a first area of the output area, the first area corresponding to the first group blocks, at a first driving frequency, drive a second area of the output area, the second area corresponding to the second group blocks, at a second driving frequency, and drive a third area of the output area, the third area corresponding to the third group blocks, at a third driving frequency, which is a medium frequency of the first driving frequency and the second driving frequency.

According to embodiments of the disclosure, areas of a display may be divided to be driven at different driving frequencies, and thus, power consumption efficiency of an electronic device may be improved. Also, a sense of difference between two adjacent areas driven at different driving frequencies, as felt by a user, may be decreased, and thus, the user's visual inconvenience may be decreased. In addition, various effects directly or indirectly identified through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
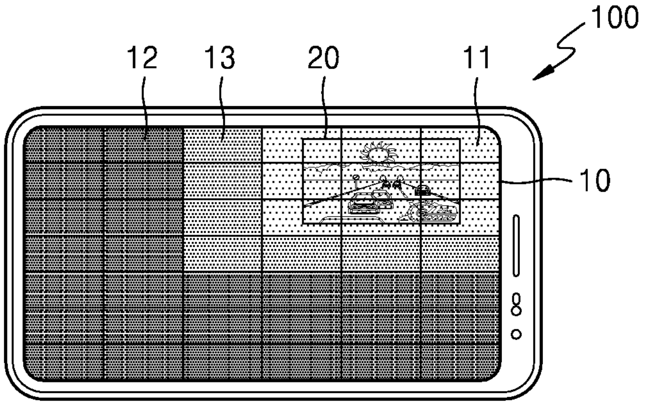
FIG. 1 illustrates an electronic device configured to display at least one piece of content, according to an embodiment of the disclosure.

FIG. 1 illustrates an electronic device configured to display at least one piece of content, according to an embodiment of the disclosure.

Referring to FIG. 1, an electronic device 100 may display at least one piece of content 20 on an output area 10 of a display. According to various embodiments, the output area 10 of the display may be understood to be an area on which the electronic device 100 displays, through the display, image data for the outside of the electronic device 100 or to be an area on which a user may view image data output by the electronic device 100 through the display.

According to various embodiments, the at least one piece of content 20 may be displayed on at least a portion of the output area 10 of the display. For example, the at least one piece of content 20 may be displayed on an upper right portion of the output area 10 as illustrated in FIG. 1 or may be displayed on a lower left portion of the output area 10 or the entirety of the output area 10 unlike it is illustrated in FIG. 1. According to various embodiments, the at least one piece of content 20 may include an execution screen of text, an image, a video, or other various applications (e.g., games, the Internet, etc.).

According to an embodiment, the output area 10 of the display may be divided into a plurality of blocks. For example, the output area 10 may be divided into the plurality of blocks having a grid shape, as illustrated in FIG. 1. According to various embodiments, the shape of the plurality of blocks is not limited to the shape illustrated in FIG. 1. According to various embodiments, FIG. 1 illustrates that the size of each of the plurality of blocks is the same, but the sizes of the blocks are not limited thereto.

According to an embodiment, the size of each of the plurality of blocks may be determined based on the hardware characteristic of the electronic device 100. For example, the display of the electronic device 100 may include a plurality of gate lines configured to apply a gate voltage to a plurality of pixels and a plurality of source lines configured to apply a source voltage to the plurality of pixels. The plurality of gate lines may be classified into a plurality of gate groups formed of a predefined number of gate lines, and the plurality of source lines may be classified into a plurality of source groups formed of a predefined number of source lines. The plurality of gate lines and the plurality of source lines may be driven based on each group, and consequently, the output area 10 of the display may be driven in units of blocks as illustrated in FIG. 1. According to an embodiment, each of the plurality of blocks may be determined based on one or more gate groups and one or more source groups. According to an embodiment, a size of each of the plurality of blocks may be determined based on the number of gate lines included in the one or more gate groups and the number of source lines included in the one or more source groups.

According to an embodiment, the size of each of the plurality of blocks may be determined based on a size of a codec between a processor and a display driving integrated (DDI) circuit of the electronic device 100. For example, image data for outputting a predefined image on the output area 10 may be transmitted from the processor to the DDI circuit based on the codec having a predefined size. The DDI circuit may output, on the display, an image corresponding to the transmitted image data, based on the size of the codec, and as a result, the output area 10 of the display may be driven in block units as illustrated in FIG. 1. According to an embodiment, the size of each of the plurality of blocks may be determined based on the size of the codec.

According to various embodiments, the size of each of the plurality of blocks may be determined based on both of the hardware characteristic of the electronic device 100 and the size of the codec between the processor and the DDI circuit.

According to an embodiment, the plurality of blocks may be classified into first group blocks 11, second group blocks 12, and third group blocks 13. According to an embodiment, the first group blocks 11 may include blocks at least partially overlapping a content area on which at least one piece of content 20 is displayed. According to an embodiment, the second group blocks 12 may include blocks not overlapping the content area and not adjacent to the first group blocks 11. According to an embodiment, the third group blocks 13 may include blocks positioned between the first group blocks 11 and the second group blocks 12.

According to an embodiment, with respect to the output area 10 of the display, the electronic device 100 may drive an area corresponding to each of the group blocks at a corresponding driving frequency. According to various embodiments, the driving frequency is a frequency at which a screen of a display is refreshed, and may be understood to be the number of times a new screen is output for one second with respect to the same area. According to various embodiments, the driving frequency may be understood to be the same as a screen refresh rate or a screen refresh frequency.

According to an embodiment, the electronic device 100 may drive a first area corresponding to the first group blocks 11 at a first driving frequency, a second area corresponding to the second group blocks 12 at a second driving frequency, and a third area corresponding to the third area at a third driving frequency. According to an embodiment, the third driving frequency may be a medium frequency of the first driving frequency and the second driving frequency. For example, when the first driving frequency is greater than the second driving frequency, the third driving frequency may be greater than or equal to the second driving frequency and less than or equal to the first driving frequency. As another example, when the first driving frequency is less than the second driving frequency, the third driving frequency may be greater than or equal to the first driving frequency and less than or equal to the second driving frequency. As another example, when the first driving frequency is equal to the second driving frequency, the third driving frequency may be equal to the first driving frequency and the second driving frequency.

According to various embodiments, there is the third area between the first area driven at the first driving frequency and the second area driven at the second driving frequency, the third area being driven at the medium frequency of the first driving frequency and the second driving frequency, and thus, the sense of difference felt by the user at a boundary of the first area and the second area due to a difference in driving frequency may be reduced, and user's visual inconvenience may be decreased. Hereinafter, in this specification, as described with reference to FIG. 1, the electronic device 100 capable of reducing user's visual inconvenience while driving different areas of a display at different driving frequencies will be described according to various embodiments.

Figure 2:
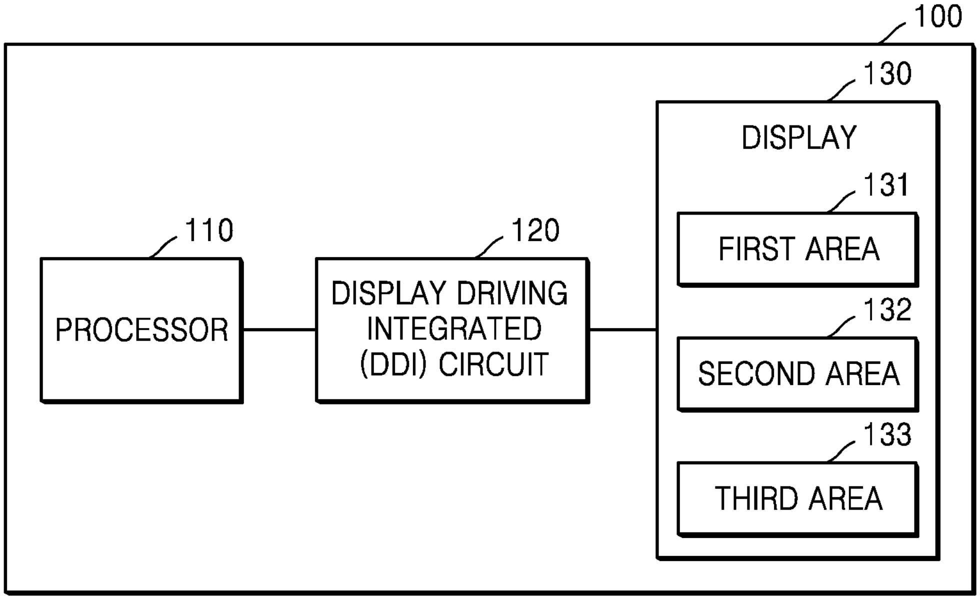
FIG. 2 is a block diagram of an electronic device according to an embodiment of the disclosure.

FIG. 2 is a block diagram of an electronic device according to an embodiment of the disclosure.

Referring to FIG. 2, an electronic device 100 may include a processor 110, a DDI circuit 120, and a display 130. According to various embodiments, elements of the electronic device 100 are not limited to the elements illustrated in FIG. 2, and the electronic device 100 may further include elements not illustrated in FIG. 2. For example, the electronic device 100 may further include a user input interface, a memory, or a communication module.

The processor 110 may be electrically connected to other elements of the electronic device 100, for example, the DDI circuit 120, and may perform a calculation or data processing for controlling and/or communication with respect to the other elements. According to various embodiments, the processor 110 may include at least one of a central processing unit (CPU), an application processor (AP), a graphics processing unit (GPU), or a neural processing unit (NPU).

According to an embodiment, the processor 110 may generate or obtain image data to output a predefined screen on the display 130 and may transmit the image data to the DDI circuit 120 through a predefined interface, for example, a mobile industry processor interface (MIPI). For example, the processor 110 may obtain information about at least one piece of content output as a predefined size on a predefined position of an output screen of the display 130 and based on the obtained information, may generate the image data for a screen which is output on the display 130. According to an embodiment, the processor 110 may transmit the image data to the display 130 based on a predefined codec. For example, the processor 110 may split or compress the generated image data into predefined sizes based on the predefined codec and may sequentially transmit the split or compressed data to the DDI circuit 120.

According to an embodiment, the processor 110 may transmit the image data to the DDI circuit 120 in response to a tearing effect (TE) signal transmitted from the DDI circuit 120. The TE signal may be a signal configured to prevent tearing or screen tearing. The tearing or the screen tearing may indicate a visual artifact generated when the image data corresponding to two or more different frames is displayed on one screen of a display panel. According to an embodiment, the TE signal may be transmitted to the processor 110 based on a driving frequency at which the display 130 is driven, and when the TE signal is transmitted based on a plurality of driving frequencies, the processor 110 may transmit the image data to the DDI circuit 120 based on a highest driving frequency of the plurality of driving frequencies.

According to an embodiment, the processor 110 may obtain information about a content area on which the at least one piece of content is displayed. According to various embodiments, the information about the content area may include at least one of information about a position of the content area, information about a size of the content area, and information with respect to a boundary of the content area.

According to an embodiment, based on the information about the content area, the processor 110 may classify a plurality of blocks included in an output area of the display 130 into first group blocks (e.g., the first group blocks 11 of FIG. 1), second group blocks (e.g., the second group blocks 12 of FIG. 1), and third group blocks (e.g., the third group blocks 13 of FIG. 1). For example, the processor 110 may determine blocks from among the plurality of blocks, the blocks at least partially overlapping the content area, to be the first group blocks. As another example, the processor 110 may determine at least some of blocks from among the plurality of blocks, the blocks not overlapping the content area and not adjacent to the first group blocks, to be the second group blocks. As another example, the processor 110 may determine blocks from among the plurality of blocks, the blocks being positioned between the first group blocks and the second group blocks, to be the third group blocks. According to various embodiments, an area corresponding to the first group blocks may be referred to as a first area 131, an area corresponding to the second group blocks may be referred to as a second area 132, and an area corresponding to the third group blocks may be referred to as a third area 133.

According to an embodiment, the processor 110 may determine a driving frequency with respect to each of the first area 131, the second area 132, and the third area 133. For example, the processor 110 may determine a first driving frequency for driving the first area 131, a second driving frequency for driving the second area 132, and a third driving frequency for driving the third area 133. According to various embodiments, the first driving frequency and the second driving frequency may be generally determined to be different from each other. However, when a certain condition is satisfied, the first and second driving frequencies may be determined to be equal to each other. For example, as described below with reference to FIG. 5B, when a user input with respect to the first area 131 is sensed, the processor 110 may determine the first driving frequency and the second driving frequency to be equal to each other.

According to an embodiment, the processor 110 may determine the third driving frequency to be a medium frequency of the first driving frequency and the second driving frequency. According to various embodiments, the medium frequency may be understood to be a frequency of a medium size of the two frequencies. For example, when the first driving frequency is greater than the second driving frequency, the third driving frequency may be greater than or equal to the second driving frequency and less than or equal to the first driving frequency. As another example, when the first driving frequency is less than the second driving frequency, the third driving frequency may be greater than or equal to the first driving frequency and less than or equal to the second driving frequency. As another example, when the first driving frequency is equal to the second driving frequency, the third driving frequency may be equal to the first driving frequency and the second driving frequency. According to an embodiment, the processor 110 may determine the third driving frequency to have an average value of the first driving frequency and the second driving frequency.

According to an embodiment, the processor 110 may determine the first driving frequency and the second driving frequency such that a difference between the first driving frequency and the second driving frequency is less than a predefined level. When the difference between the first driving frequency and the second driving frequency is greater than the predefined level, visual inconvenience experienced by a user may not be resolved even when the third area 133 is driven at the third driving frequency, and thus, the difference between the first driving frequency and the second driving frequency may be limited to be less than the predefined level.

According to an embodiment, the processor 110 may determine the first driving frequency based on a type of at least one piece of content displayed on the first area 131. For example, when the at least one piece of content is a still image, for example, an image, the processor 110 may determine the first driving frequency to be relatively low. As another example, when the at least one piece of content is a motion image, for example, a video or an execution screen of a game application, the processor 110 may determine the first driving frequency to be relatively high. As another example, when the processor 110 determines that the at least one piece of content generates relatively large loads, for example, when a file size of the at least one piece of content is greater than or equal to a predefined level, the processor 110 may determine the first driving frequency to be relatively low. According to an embodiment, the processor 110 may determine the second driving frequency and the third driving frequency based on the first driving frequency. For example, the processor 110 may determine the second driving frequency and the third driving frequency such that a difference between the second driving frequency or the third driving frequency and the first driving frequency is less than or equal to a predefined level.

According to an embodiment, the processor 110 may determine the first driving frequency, the second driving frequency, and the third driving frequency based on a user input, a user configuration, or an application configuration. For example, the processor 110 may determine the first driving frequency, the second driving frequency, and the third driving frequency based on a user input of increasing or decreasing a driving frequency of a certain area (e.g., the first area 131 or the second area 132). As another example, the processor 110 may determine the first driving frequency, the second driving frequency, and the third driving frequency based on the aspect preset by a user with respect to a use environment of the electronic device 100. As another example, the processor 110 may determine the first driving frequency, the second driving frequency, and the third driving frequency based on an execution configuration of an application for executing the at least one piece of content.

According to an embodiment, the processor 110 may control the DDI circuit 120 such that the at least one piece of content is displayed on the display 130 based on the determined first group blocks, second group blocks, and third group blocks and the determined first driving frequency, second driving frequency, and third driving frequency. For example, as described above, the processor 110 may determine the first group blocks, the second group blocks, the third group blocks, the first driving frequency, the second driving frequency, and the third driving frequency and transmit information with respect to the determined first group blocks, second group blocks, third group blocks, first driving frequency, second driving frequency, and third driving frequency to the DDI circuit 120. The DDI circuit 120 may drive each area of the display to output the at least one piece of content on the display 130 based on the transmitted information.

The DDI circuit 120 may convert the image data transmitted from the processor 110 into an electrical signal (e.g., a voltage or a current) and transmit the converted electrical signal to the display 130. For example, the DDI circuit 120 may include a gate driver and a source driver and may apply a gate voltage to a plurality of gate lines through the gate driver or apply a source voltage to a plurality of source lines through the source driver.

According to an embodiment, the DDI circuit 120 may transmit the electrical signal to the display 130 based on the information with respect to the first group blocks, the second group blocks, the third group blocks, the first driving frequency, the second driving frequency, and the third driving frequency, the information being transmitted from the processor 110. For example, the DDI circuit 120 may apply a gate voltage to the gate lines connected to first group pixels included in the first group blocks at the first driving frequency. As another example, the DDI circuit 120 may apply a gate voltage to the gate lines connected to second group pixels included in the second group blocks at the second driving frequency. According to various embodiments, by applying a source voltage to the pixels to which the gate voltage is applied, the DDI circuit 120 may output a screen on a certain area (e.g., an area corresponding to the pixels to which the gate voltage is applied) of the display 130.

According to an embodiment, the DDI circuit 120 may transmit a TE signal to the processor 110, based on the information with respect to the first driving frequency, the second driving frequency, and the third driving frequency, the information being transmitted from the processor 110. For example, the DDI circuit 120 may transmit the TE signal to the processor 110 at the same frequency as the first driving frequency, in order to obtain image data corresponding to the first group blocks. The processor 110 may, in response to the TE signal, transmit, to the DDI circuit 120, the image data corresponding to the first group blocks. As another example, the DDI circuit 120 may transmit the TE signal to the processor 110 at the same frequency as the second driving frequency, in order to obtain image data corresponding to the second group blocks. The processor 110 may, in response to the TE signal, transmit, to the DDI circuit 120, the image data corresponding to the second group blocks.

The display 130 may visually display the image data via the DDI circuit 120. According to various embodiments, the display 130 may be any one of a thin-film transistor-liquid crystal display (TFT-LCD), a light-emitting diode (LED) display, an organic LED (OLED) display, an active matrix OLED (AMOLED) display, or a flexible display. In this specification, the display 130 may be understood to be the same as a display panel.

According to an embodiment, the display 130 may include the first area 131, the second area 132, and the third area 133 as the output area. The first area 131 may be an area of the output area, the area corresponding to the first group blocks determined by the processor 110, the second area 132 may be an area of the output area, the area corresponding to the second group blocks determined by the processor 110, and the third area 133 may be an area of the output area, the area corresponding to the third group blocks determined by the processor 110.

According to an embodiment, in the display 130, a plurality of gate lines and a plurality of source lines may be alternately arranged in a matrix form. According to an embodiment, a gate signal from a gate driver may be supplied to the gate lines, and thus, a gate voltage may be supplied to pixels included in the display 130. According to an embodiment, the gate lines may be grouped into a plurality of groups, and a gate signal may be supplied for each group. For example, when the gate signal is supplied to a first group of the gate lines, based on a first frequency, the gate signal may be sequentially supplied to the gate lines included in the first group, and the gate lines included in the first group may be driven at the first frequency. According to an embodiment, a signal corresponding to the image data may be supplied to the source lines, and thus, a source voltage may be supplied to the pixels included in the display 130. The signal corresponding to the image data may be supplied from a source driver based on control by a timing controller of a logic circuit.

Figure 3:
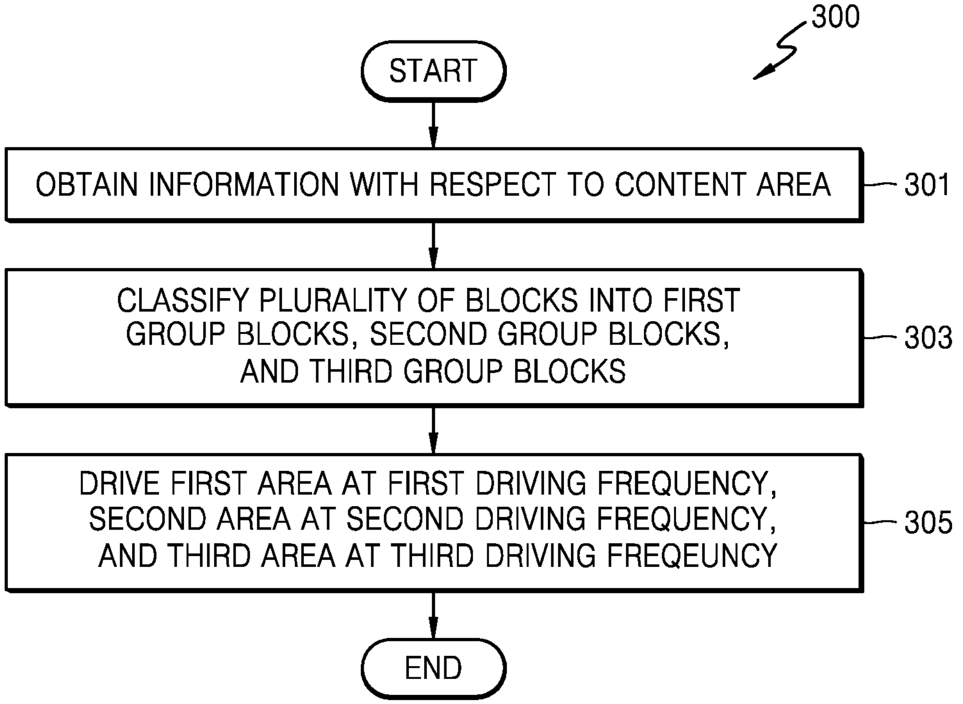
FIG. 3 is a flowchart of a method, performed by an electronic device, of displaying at least one piece of content, according to an embodiment of the disclosure.

FIG. 3 is a flowchart of a method, performed by an electronic device, of displaying at least one piece of content, according to an embodiment of the disclosure.

Referring to FIG. 3, the method, performed by an electronic device (e.g., an electronic device 100 of FIG. 1), of displaying the at least one piece of content (e.g., at least one piece of content 20 of FIG. 1) may include operations 301 to 305. According to various embodiments, operations 301 to 305 may be understood to be performed by the electronic device 100 or the processor 110 illustrated in FIG. 2. According to various embodiments, the method, performed by the electronic device, of displaying the at least one piece of content is not limited to the method illustrated in FIG. 3 and may omit any one of operations illustrated in FIG. 3 or further include an operation not illustrated in FIG. 3. For example, the method 300 may further include determining a first driving frequency, a second driving frequency, and a third driving frequency between operations 303 and 305.

In operation 301, the electronic device may obtain information about a content area on which the at least one piece of content is displayed. According to various embodiments, the information about the content area may include at least one of information about a position of the content area, information about a size of the content area, and information with respect to a boundary of the content area.

According to various embodiments, the electronic device may obtain the information about the content area from information (e.g., information about a position, size, or boundary that is output during previous execution) with respect to execution of an application for displaying the at least one piece of content and information (e.g., information about a size or an application connected for execution) with respect to the at least one piece of content stored in a memory of the electronic device.

In operation 303, based on the information about the content area obtained in operation 301, the electronic device may classify a plurality of blocks included in the output area of the display into first group blocks, second group blocks, and third group blocks. According to an embodiment, the first group blocks may include blocks at least partially overlapping the content area, the second group blocks may include at least some of blocks not overlapping the content area and not adjacent to the first group blocks, and the third group blocks may include blocks positioned between the first group blocks and the second group blocks.

In operation 305, the electronic device may drive a first area corresponding to the first group blocks at a first driving frequency, a second area corresponding to the second group blocks at a second driving frequency, and a third area corresponding to the third group blocks at a third driving frequency. By doing so, the electronic device may output the at least one piece of content on a display, may increase power consumption efficiency with respect to the driving of the display, and may reduce user's visual inconvenience.

Figure 4:
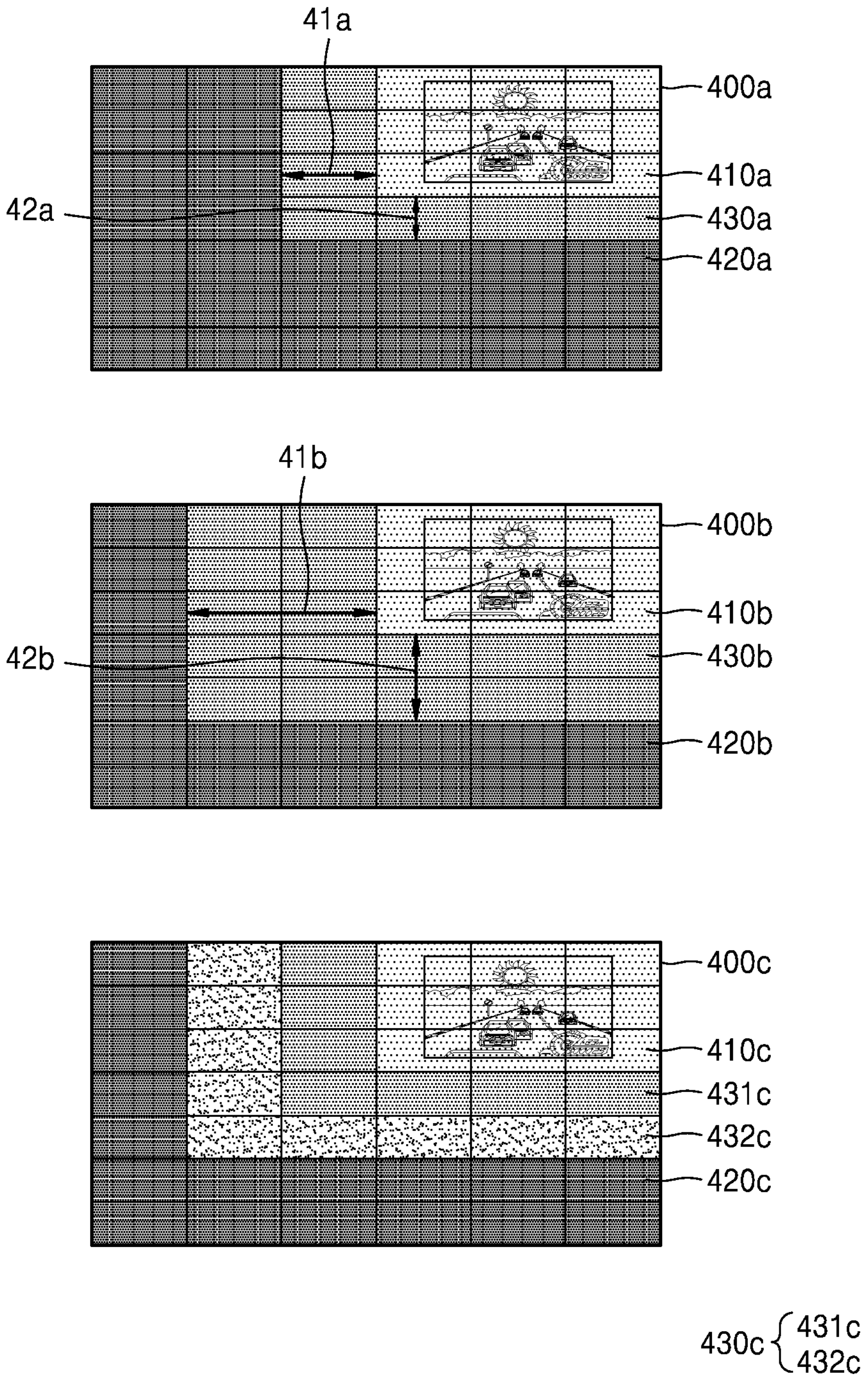
FIG. 4 illustrates a third area of an output area of a display, according to an embodiment of the disclosure.

FIG. 4 illustrates a third area of an output area of a display, according to an embodiment of the disclosure.

Referring to FIG. 4, as output screens of the display according to various embodiments, a first screen 400*a*, a second screen 400*b*, and a third screen 400*c* are illustrated.

According to an embodiment, the first screen 400*a* may include a first area 410*a*, a second area 420*a*, and a third area 430*a*. According to an embodiment, the third area 430*a* may be positioned between the first area 410*a* and the second area 420*a*, and a width of the third area 430*a* may be a first distance 41*a* or a second distance 42*a*. According to various embodiments, the first distance 41*a* and the second distance 42*a* may be based on a block size. For example, the first distance 41*a* and the second distance 42*a* may be understood to be a horizontal width or a vertical width of one block. According to an embodiment, an area of the third area 430*a* may be based on the first distance 41*a* and the second distance 42*a*.

According to an embodiment, the first area 410*a* of the first screen 400*a* may be driven at a first driving frequency, the second area 420*a* may be driven at a second driving frequency, and a difference between the first driving frequency and the second driving frequency may be less than a predefined level. Because the difference between the first driving frequency and the second driving frequency is less than the predefined level, user's visual inconvenience due to the difference between the first driving frequency and the second driving frequency may be reduced, even when the first distance 41*a* or the second distance 42*a*, which is the width of the third area 430*a*, is less than a predefined distance.

According to another embodiment, the second screen 400*b* may include a first area 410*b*, a second area 420*b*, and a third area 430*b*. According to an embodiment, the third area 430*b* may be positioned between the first area 410*b* and the second area 420*b*, and a width of the third area 430*b* may be a first distance 41*b* or a second distance 42*b*. According to an embodiment, the first distance 41*b* and the second distance 42*b* may be greater than a predefined distance. For example, the first distance 41*b* and the second distance 42*b* of the second screen 400*b* may be greater than the first distance 41*a* and the second distance 42*a* of the first screen 400*a*.

According to an embodiment, the first area 410*b* of the second screen 400*b* may be driven at a first driving frequency, the second area 420*b* may be driven at a second driving frequency, and a difference between the first driving frequency and the second driving frequency may be greater than or equal to a predefined level. Because the first distance 41*b* or the second distance 42*b*, which is the width of the third area 430*b*, is greater than the predefined distance, user's visual inconvenience due to the difference between the first driving frequency and the second driving frequency may be reduced, even when the difference between the first driving frequency and the second driving frequency is greater than or equal to the predefined level.

According to various embodiments, the first distance 41*b* and the second distance 42*b*, which is the width of the third area 430*b* in the second screen 400*b*, may be determined based on the difference between the first driving frequency and the second driving frequency. For example, as the difference between the first driving frequency and the second driving frequency increases, the first distance 41*b* and the second distance 42*b*, which is the width of the third area 430*b*, may be determined to be increased. As another example, as the difference between the first driving frequency and the second driving frequency decreases, the first distance 41*b* and the second distance 42*b*, which is the width of the third area 430*b*, may be determined to be decreased. According to various embodiments, a processor (e.g., the processor 110 of FIG. 2) may determine an area of the third area 430*b* based on the difference between the first driving frequency and the second driving frequency and may determine blocks corresponding to the third group blocks.

According to another embodiment, the third screen 400*c* may include a first area 410*c*, a second area 420*c*, and a third area 430*c*. According to an embodiment, a difference between a first driving frequency and a second driving frequency may be greater than or equal to a predefined level. In this case, the third area 430*c* of the third screen 400*c* may include a first medium area 431*c* and a second medium area 432*c*. According to various embodiments, the number of medium areas (e.g., the first medium area 431*c* and the second medium area 432*c*) included in the third screen 400*c* may be determined based on the difference between the first driving frequency and the second driving frequency. For example, as the difference between the first driving frequency and the second driving frequency increases, the number of medium areas included in the third area 430*c* may be increased. As another example, as the difference between the first driving frequency and the second driving frequency decreases, the number of medium areas included in the third area 430*c* may be decreased. According to various embodiments, FIG. 4 illustrates that the number of medium areas is two. However, the number of medium areas is not limited thereto and may be three or higher.

According to an embodiment, the medium areas included in the third area 430*c*, for example, the first medium area 431*c* and the second medium area 432*c*, may be driven at a third driving frequency, which is a medium frequency of the first driving frequency and the second driving frequency. For example, the first medium area 431*c* may be driven at a first medium frequency, which is a medium frequency of the first driving frequency and the second driving frequency, and the second medium area 432*c* may be driven at a second medium driving frequency, which is a medium frequency of the first driving frequency and the second driving frequency.

According to an embodiment, the medium areas included in the third area 430*c*, for example, the first medium area 431*c* and the second medium area 432*c*, may be positioned between the first area 410*c* and the second area 420*c*. For example, the first medium area 431*c* may be positioned between the first area 410*c* and the second medium area 432*c*, and the second medium area 432*c* may be positioned between the first medium area 431*c* and the second area 420*c*. In other words, first medium blocks corresponding to the first medium area 431*c* may be positioned between first group blocks and second medium blocks corresponding to the second medium area 432*c*, and second medium blocks may be positioned between the first medium blocks and second group blocks.

According to an embodiment, the first medium area 431*c* corresponding to the first medium blocks may be driven at the first medium driving frequency, and the second medium area 432*c* corresponding to the second medium blocks may be driven at the second medium driving frequency. In this case, the first medium driving frequency may be understood to be a medium frequency of the first driving frequency and the second medium driving frequency, and the second medium driving frequency may be understood to be a medium frequency of the first medium driving frequency and the second driving frequency.

According to various embodiments, because the third area 430*c* may include the plurality of medium areas, and each medium areas may be driven at the medium driving frequency, user's visual inconvenience due to the difference between the first driving frequency and the second driving frequency may be reduced, even when the difference between the first driving frequency and the second driving frequency is greater than or equal to a predefined level.

Figure 5A:
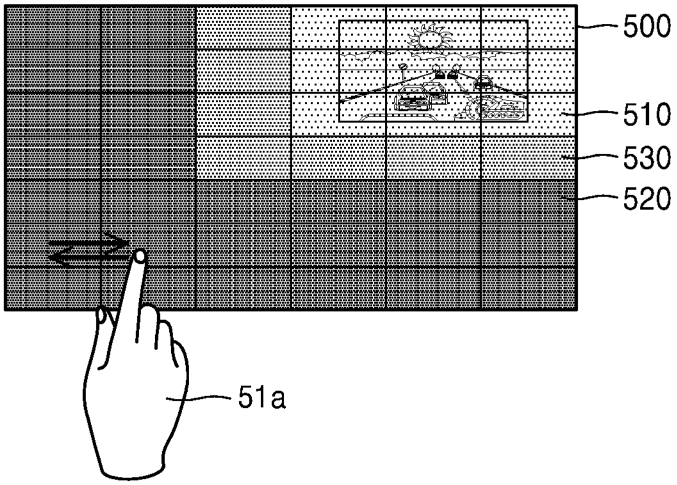
FIG. 5A illustrates an electronic device configured to change a driving frequency based on a user input, according to an embodiment of the disclosure.

FIG. 5A illustrates an electronic device configured to change a driving frequency based on a user input, according to an embodiment of the disclosure.

Figure 5B:
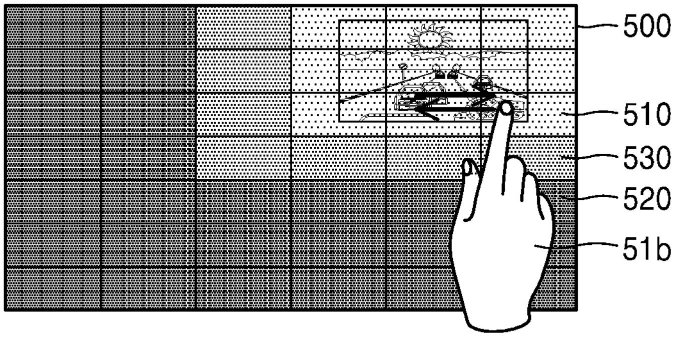
FIG. 5B illustrates an electronic device configured to change a driving frequency based on a user input, according to an embodiment of the disclosure.

FIG. 5B illustrates an electronic device configured to change a driving frequency based on a user input, according to an embodiment of the disclosure.

Referring to FIGS. 5A and 5B, an output screen 500 of a display may display at least one piece of content. According to various embodiments, the output screen 500 of the display may include a first area 510, a second area 520, and a third area 530. According to various embodiments, a user input 51*a* or 51*b* may be input on a certain area of the output screen 500. For example, the user input 51*a* or 51*b* may be input on the second area 520 as illustrated in FIG. 5A or on the first area 510 as illustrated in FIG. 5B.

According to various embodiments, the user input 51*a* or 51*b* may be understood to be a touch input that is input by using a part (e.g., a finger) of a body of a user. According to various embodiments, the touch input may include any one of tapping, double tapping, dragging, flicking, and hovering or may include other touch inputs, for example, a motion of moving a part of the body of the user in a predefined direction after tapping.

Referring to FIG. 5A, when the user input 51*a* is input on the second area 520, a second driving frequency, which is a driving frequency of the second area 520, may be changed. For example, a processor (e.g., the processor 110 of FIG. 2) of an electronic device (e.g., the electronic device 100 of FIG. 2) may sense the user input 51*a* on the second area 520, and in response to the sensed user input 51*a*, may increase or decrease the second driving frequency, which is the driving frequency of the second area 520.

According to an embodiment, when the second driving frequency is changed in response to the user input 51*a*, a third driving frequency or an area of the third area 530 may be changed based on the changed second driving frequency. For example, when the second driving frequency is changed in response to the user input 51*a*, the third driving frequency may be changed to have an average value of the changed second driving frequency and a first driving frequency. As another example, when the second driving frequency is changed in response to the user input 51*a*, a difference between the first driving frequency and the second driving frequency may be changed, and the area of the third area 530 may be changed based on the changed difference as described with reference to FIG. 4. As another example, when the second driving frequency is changed in response to the user input 51*a*, the difference between the first driving frequency and the second driving frequency may be changed, and the number of medium areas included in the third area 530 may be changed based on the changed difference as described with reference to FIG. 4.

Referring to FIG. 5B, when the user input 51*b* is input on the first area 510, the first driving frequency, which is a driving frequency of the first area 510, may be changed. For example, the processor of the electronic device may sense the user input 51*b* on the first area 510, and in response to the sensed user input 51*b*, may increase or decrease the first driving frequency, which is the driving frequency of the first area 510. According to an embodiment, when the user input 51*b* is input on the first area 510, the first driving frequency may be changed such that the first driving frequency may be an integer multiple of the second driving frequency, or the second driving frequency may be an integer multiple of the first driving frequency. For example, the first driving frequency may be changed to be equal to the second driving frequency. When the user input 51*b* is input on the first area 510, a content area on which at least one piece of content is displayed may be shifted based on the user input 51*b*, and thus, the division of the first area 510, the second area 520, and the third area 530 may be changed. The change of the first driving frequency may be performed by maintaining a mutual integer relationship with the second driving frequency, and thus, user's visual inconvenience which may occur due to the change of the division of the first to third area 510 to 530 may be reduced.

According to an embodiment, when the first driving frequency is changed in response to the user input 51*b*, the third driving frequency or the area of the third area 530 may be changed based on the changed first driving frequency. For example, when the first driving frequency is changed in response to the user input 51*b*, the first driving frequency may be changed to have an average value of the changed first driving frequency and the second driving frequency. For example, when the first driving frequency is changed to be equal to the second driving frequency, the third driving frequency may also be changed to be equal to the second driving frequency. As another example, when the first driving frequency is changed in response to the user input 51*b*, a difference between the first driving frequency and the second driving frequency may be changed, and the area of the third area 530 may be changed based on the changed difference as described with reference to FIG. 4. As another example, when the first driving frequency is changed in response to the user input 51*b*, the difference between the first driving frequency and the second driving frequency may be changed, and the number of medium areas included in the third area 530 may be changed based on the changed difference as described with reference to FIG. 4.

Figure 6A:
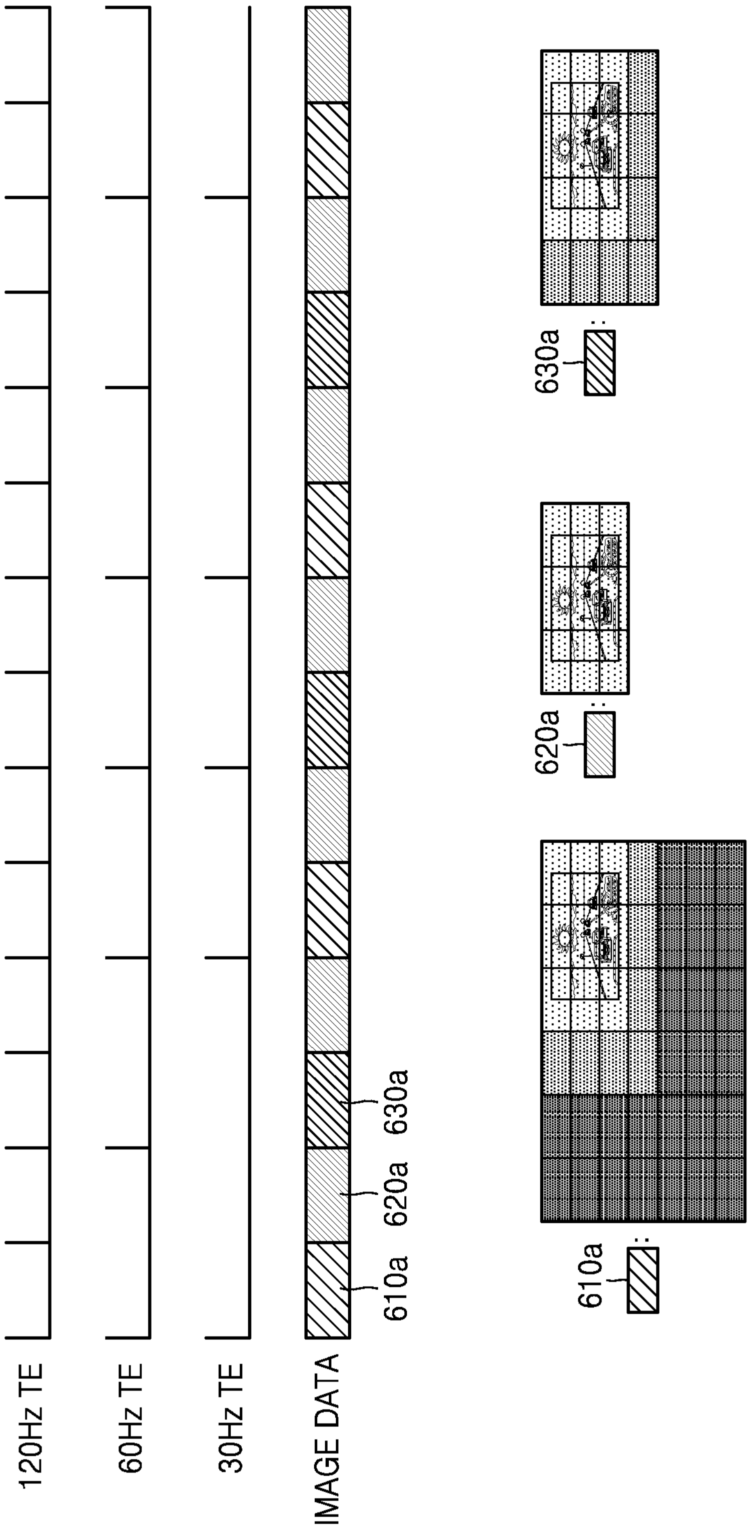
FIG. 6A illustrates image data transmitted to a display driving integrated (DDI) circuit in order to display at least one piece of content, according to an embodiment of the disclosure.

FIG. 6A illustrates image data transmitted to a DDI circuit in order to display at least one piece of content, according to an embodiment of the disclosure.

Figure 6B:
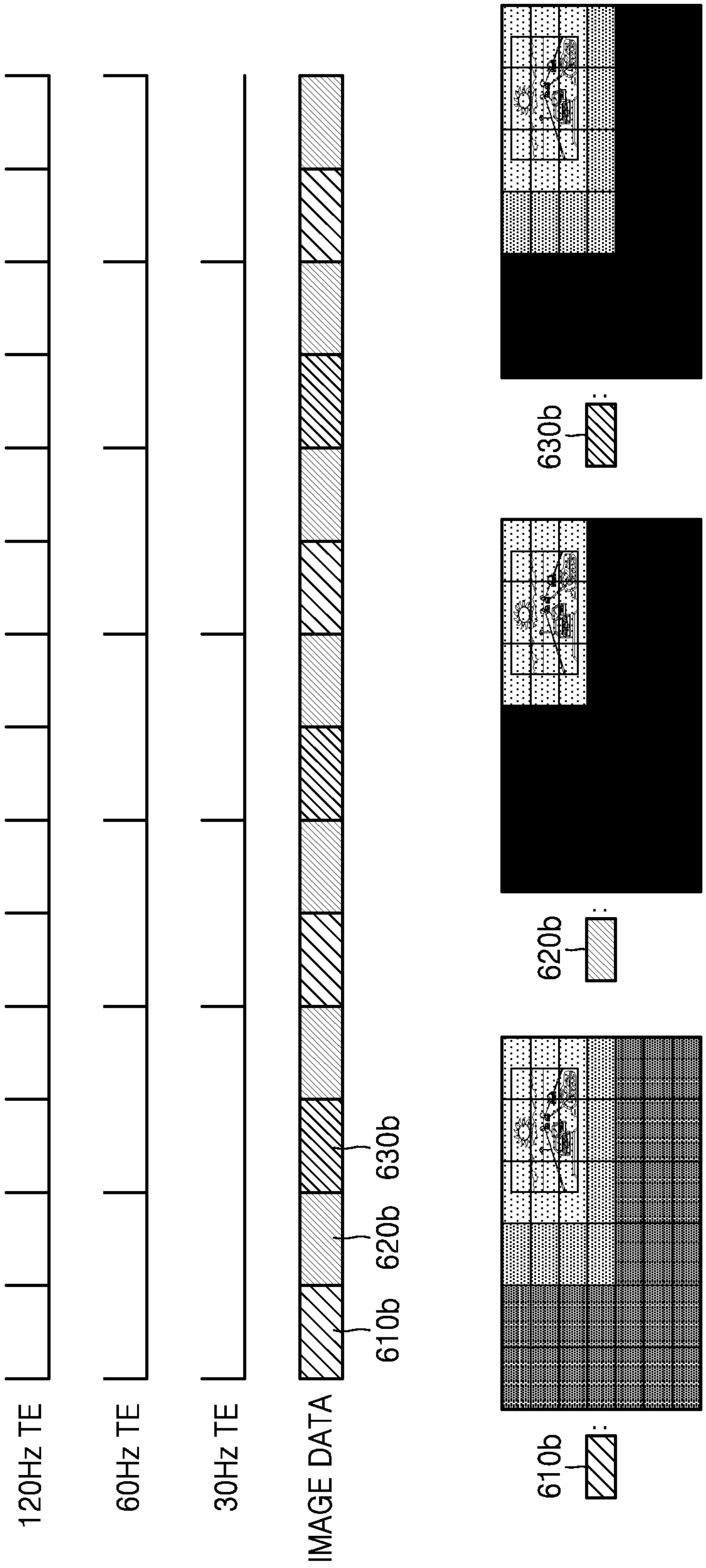
FIG. 6B illustrates image data transmitted to a DDI circuit in order to display at least one piece of content, according to an embodiment of the disclosure.

FIG. 6B illustrates image data transmitted to a DDI circuit in order to display at least one piece of content, according to an embodiment of the disclosure.

Figure 6C:
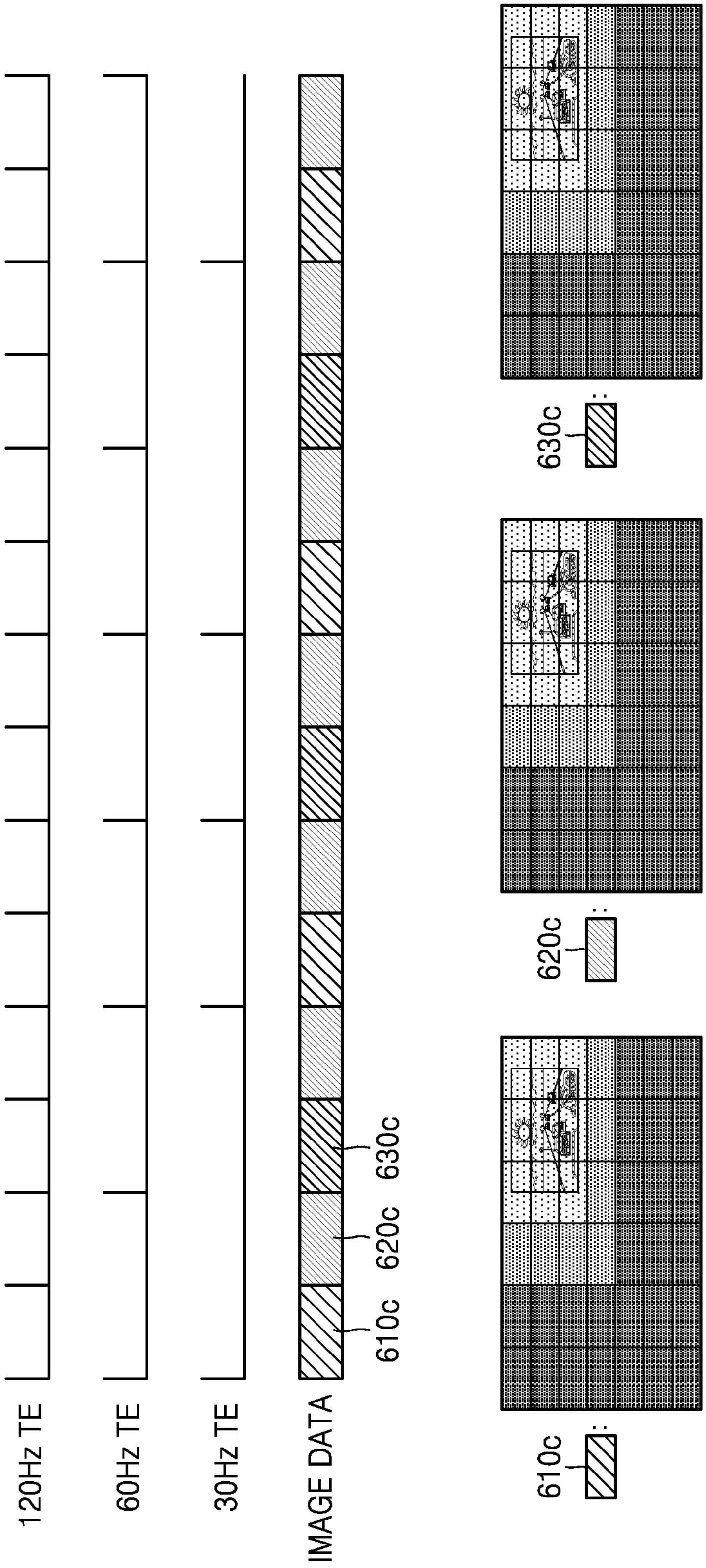
FIG. 6C illustrates image data transmitted to a DDI circuit in order to display at least one piece of content, according to an embodiment of the disclosure.

FIG. 6C illustrates image data transmitted to a DDI circuit in order to display at least one piece of content, according to an embodiment of the disclosure.

According to an embodiment, a processor (e.g., the processor 110 of FIG. 2) may transmit image data to a DDI circuit based on a TE signal transmitted from the DDI circuit (e.g., the DDI circuit 120 of FIG. 2). The TE signal may be a signal configured to prevent tearing or screen tearing, and the DDI circuit may transmit the TE signal to the processor based on a driving frequency at which each area of a display is driven. According to an embodiment, when the DDI circuit drives a plurality of areas at different driving frequencies, for example, when the DDI circuit drives a first area at a first driving frequency, a second area at a second driving frequency, and a third area at a third driving frequency, the DDI circuit may transmit a plurality of TE signals to the processor based on the different driving frequencies.

According to various embodiments, the plurality of TE signals may include a first TE signal for driving the first area of the display at the first driving frequency, a second TE signal for driving the second area of the display at the second driving frequency, and a third TE signal for driving the third area of the display at the third driving frequency. According to an embodiment, as illustrated in FIGS. 6A, 6B, and 6C, a frequency of the first TE signal may be 120 hertz (Hz), a frequency of the second TE signal may be 30 Hz, and a frequency of the third TE signal may be 60 Hz. In the descriptions of FIGS. 6A, 6B, and 6C, the first TE signal may be referred to as a 120 Hz TE signal, the second TE signal may be referred to as a 30 Hz TE signal, and the third TE signal may be referred to as a 60 Hz TE signal.

According to various embodiments, the frequencies of the first to third TE signals may have a relationship in which each of the frequency of the first TE signal, the frequency of the second TE signal, and the frequency of the third TE signal is multiple times of each other, but the disclosure is not limited thereto. For example, unlike the illustrations of FIGS. 6A, 6B, and 6C, the first TE signal, the second TE signal, and the third TE signal may be 100 Hz, 40 Hz, and 60 Hz, respectively.

Referring to FIGS. 6A, 6B, and 6C, the image data may be generated or transmitted based on the 120 Hz TE signal, the 60 Hz TE signal, and/or the 30 Hz TE signal. For example, first image data 610*a*, 610*b*, or 610*c* may be transmitted from the processor to the DDI circuit in response to the 120 Hz TE signal, the 60 Hz TE signal, and the 30 Hz TE signal. As another example, second image data 620*a*, 620*b*, or 620*c* may be transmitted from the processor to the DDI circuit in response to the 120 Hz TE signal. As another example, third image data 630*a*, 630*b*, or 630*c* may be transmitted from the processor to the DDI circuit in response to the 120 Hz TE signal and the 30 Hz TE signal.

Referring to FIG. 6A, according to an embodiment, the image data may include all of data with respect to the first area, data with respect to the second area, and data with respect to the third area. For example, the first image data 610*a* may include the data with respect to the first area, the data with respect to the second area, and the data with respect to the third area, because all of the 120 Hz TE signal, the 60 Hz TE signal, and the 30 Hz TE signal are transmitted.

According to another embodiment, data of the image data, the data corresponding to a first frame to drive one or more of the first to third areas, may not include data corresponding to areas other than the one or more of the first to third areas. For example, the second image data 620*a* may be data for driving only the first area because only the 120 Hz TE signal is transmitted, and the second image data 620*a* may not include data corresponding to the second area and the third area other than the first area. As another example, the third image data 630*a* may be data for driving only the first area and the third area because the 120 Hz TE signal and the 60 Hz TE signal are transmitted, and the third image data 530*a* may not include data corresponding to the second area other than the first area and the third area. According to various embodiments, when the image data does not include data corresponding to one or more areas, data transmission between the processor and the DDI circuit may be relatively more efficiently performed.

According to various embodiments, when data with respect to one or more areas of an output area of a display area is not included, as in the case of the second image data 620*a* and the third image data 630*a* of FIG. 6A, the processor may transmit, to the DDI circuit, information with respect to a start point and information with respect to an end point, together with the second image data 620*a* and the third image data 630*a*. For example, the processor may transmit, to the DDI circuit, the information with respect to a start point and the information with respect to an end point with respect to the second image data 620*a*, together with the second image data 620*a*. The information with respect to the start point may be understood to be the information indicating from which position of a memory, in which image data with respect to the entire output area is stored, corresponding image data has to be stored. The information with respect to the end point may be understood to be the information indicating to which position of the memory, in which the image data with respect to the entire output area is stored, corresponding image data has to be stored.

Referring to FIG. 6B, according to an embodiment, data of the image data, the data corresponding to a first frame to drive one or more of the first to third areas, may include masking-processed data with respect to areas other than the one or more of the first to third areas. The masking process may be understood to be an operation of processing data with respect to a certain area to be, for example, data of a black color or a single color. For example, the second image data 620*b* may be data for driving only the first area because only the 120 Hz TE signal is transmitted, and in the second image data 620*b*, data corresponding to the second and third areas other than the first area may be masking-processed. As another example, the third image data 630*b* may be data for driving only the first area and the third area because the 120 Hz TE signal and the 60 Hz TE signal are transmitted, and in the third image data 630*b*, data corresponding to the second area other than the first and third areas may be masking-processed. According to various embodiments, when the data of the image data, the data corresponding to only one or more areas, includes the masking-processed data, data transmission between the processor and the DDI circuit may be relatively more efficiently performed.

Referring to FIG. 6C, according to an embodiment, data of the image data, the data corresponding to a first frame to drive one or more of the first to third areas, may also include data with respect to areas other than the one or more of the first to third areas. For example, the second image data 620*c* and the third image data 630*c* may be the image data for driving the first area and the first and second areas, respectively. However, the second image data 620*c* and the third image data 630*c* may include data with respect to other areas. In this case, after the DDI circuit obtains the second image data 620*c* and the third image data 630*c*, the DDI circuit may drive the corresponding area by using only the data corresponding to the corresponding area to be driven.

Figure 7:
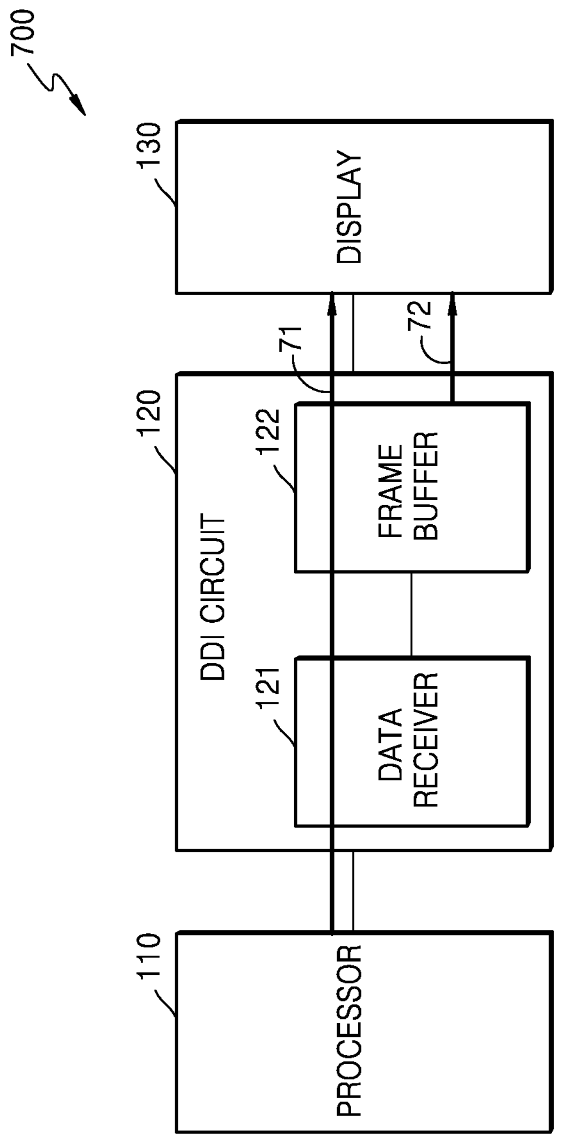
FIG. 7 is a block diagram of an electronic device including a panel self-refresh (PSR) function, according to an embodiment of the disclosure.

FIG. 7 is a block diagram of an electronic device including a panel self-refresh (PSR) function, according to an embodiment of the disclosure.

Referring to FIG. 7, an electronic device 700 may include a processor 110, a DDI circuit 120, and a display 130. According to an embodiment, the DDI circuit 120 may include a data receiver 121 and a frame buffer 122.

According to an embodiment, the data receiver 121 may obtain image data from the processor 110. Through the data receiver 121, the DDI circuit 120 may obtain, from the processor 110, the image data to output a predefined screen on the display 130. The image data obtained through the data receiver 121 may be stored in the frame buffer 122 in units of frames and may be transmitted to the display 130 from the frame buffer 122. Based on this configuration, the DDI circuit 120 may display the predefined screen on the display 130 based on the image data. The image data may include data with respect to consecutive frames, and each of the consecutive frames may be sequentially transmitted based on a driving frequency. The transmitting of the image data and the outputting of the predefined screen may be understood to be a first path 71 illustrated in FIG. 7.

According to an embodiment, when data with respect to a predefined number of consecutive frames of the image data is the same, that is, when the screen displayed on the display 130 during a predefined time period is a still image, the DDI circuit 120 may operate in a PSR mode. According to an embodiment, in the PSR mode, the processor 110 may not transmit the image data to the DDI circuit 120, and the processor 110 and the data receiver 121 may operate in a sleep state. The sleep state may be understood to be a state in which an operation or a function of the data receiver 121 is limited and power consumption is minimized. The DDI circuit 120 may drive the display 130 by using image data stored in the frame buffer 122 and most recently obtained from the processor 110. While the DDI circuit 120 operates in the PSR mode, the DDI circuit 120 may not obtain new image data from the processor 110 and may display, on the display 130, based on a predefined driving frequency, a predefined screen corresponding to the image data stored in the frame buffer 122. The outputting of the predefined screen in the PSR mode may be understood to be a second path 72 illustrated in FIG. 7. By doing so, the electronic device 700 may display a predefined screen and increase power consumption efficiency.

According to an embodiment, an output area of the display 130 may be divided into a plurality of output areas, and the DDI circuit 120 may drive the output area by dividing the output area into the plurality of output areas. For example, the output area of the display 130 may be divided into a first output area and a second output area, and the frame buffer 122 may include a first frame buffer for driving the first output area and a second frame buffer for driving the second output area. In this case, the image data obtained through the data receiver 121 may be stored in the first frame buffer or the second frame buffer based on the corresponding output area and may be sequentially transmitted to the first output area or the second output area of the display 130.

According to an embodiment, the DDI circuit 120 may drive the plurality of output areas of the output area of the display 130 at different driving frequencies from each other, and when data with respect to a predefined number of consecutive frames is the same in the image data with respect to at least one or more of the plurality of output areas, the DDI circuit 120 may operate in a PSR mode. For example, when the data with respect to the predefined number of consecutive frames in the image data transmitted from the processor 110 is the same with respect to at least one or more of a first area driven at a first driving frequency, a second area driven at a second driving frequency, and a third area driven at a third driving frequency, the DDI circuit 120 may operate in the PSR mode with respect to the at least one or more areas.

According to an embodiment, the display 130 may be a display including a display panel using an oxide transistor. In this case, in each of pixels included in the display panel, light may be emitted based on previously input data even when new data is not input from the frame buffer 122 of the DDI circuit 120. In this case, while the DDI circuit 120 operates in the PSR mode, each pixel included in the display panel may not obtain the new data from the frame buffer 122, and the frame buffer 122 may operate in the sleep state like the processor 110 and the data receiver 121.

Figure 8:
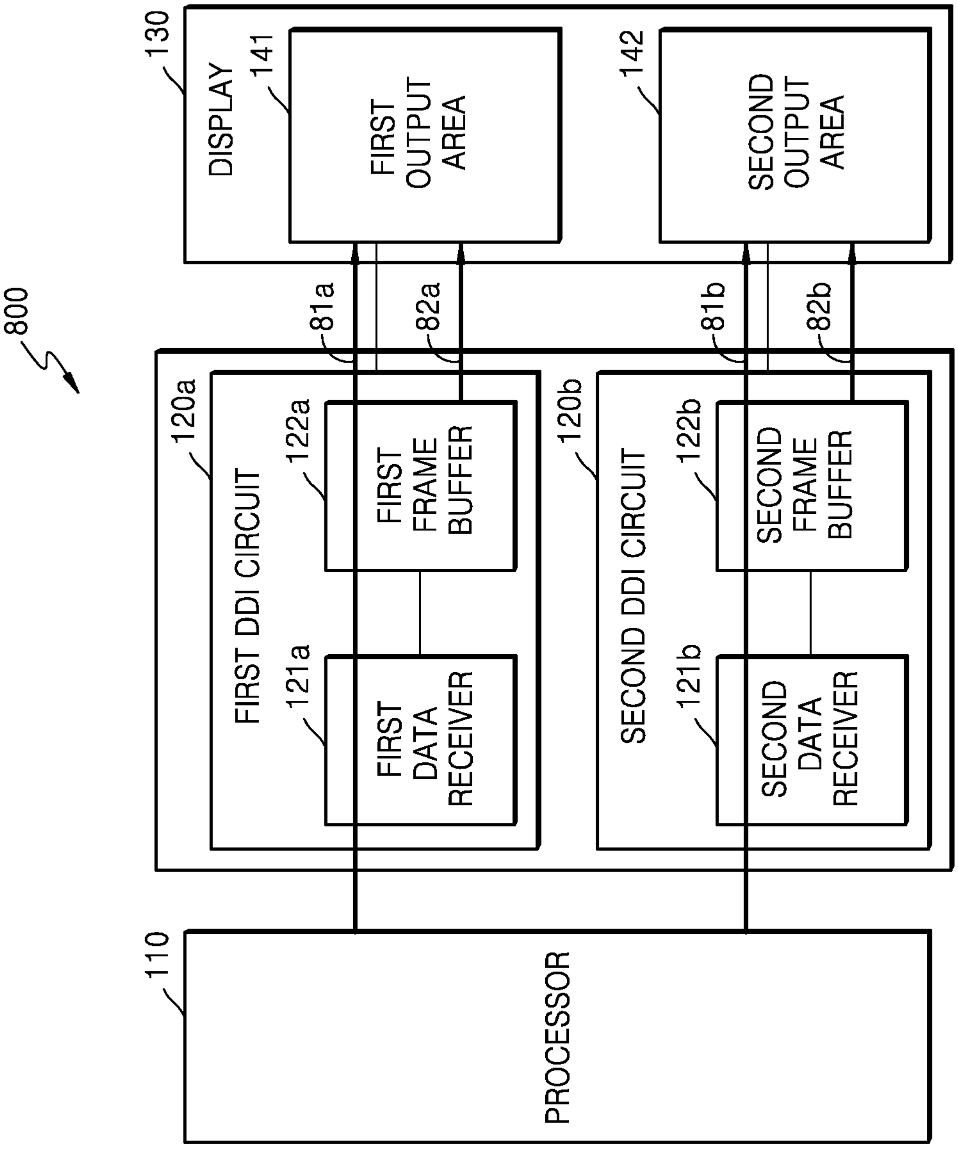
FIG. 8 is a block diagram of an electronic device including a PSR function, according to an embodiment of the disclosure.

FIG. 8 is a block diagram of an electronic device including a PSR function, according to an embodiment of the disclosure.

Referring to FIG. 8, an electronic device 800 may include a processor 110, a DDI circuit 120, and a display 130. According to an embodiment, the DDI circuit 120 may include a first DDI circuit **120*a* and a second DDI circuit 120*b*, wherein the first DDI circuit 120*a* may drive a first output area 141 of the display 130, and the second DDI circuit 120*b* may drive a second output area 142 of the display 130. According to an embodiment, the first DDI circuit 120*a* may include a first data receiver 121*a* and a first frame buffer 122*a*, and the second DDI circuit 120*b* may include a second data receiver 121*b* and a second frame buffer 122*b***.

According to an embodiment, along a first path **81*a*, the first DDI circuit 120*a* may receive first image data from the processor 110 through the first data receiver 121*a* and display a screen corresponding to the first image data on the first output area 141 of the display 130. According to an embodiment, the first DDI circuit 120*a* may operate in the PSR mode, when data with respect to a predefined number of consecutive frames is the same in the first image data, regardless of the second DDI circuit 120*b*. When the first DDI circuit 120*a* operates in the PSR mode, the first data receiver 121*a* may operate in a sleep mode. In this case, a screen corresponding to the first image data that is stored in the first frame buffer 122*a* and most recently obtained from the processor 110 may be displayed on the first output area 141 of the display 130 along a second path 82*a* illustrated in FIG. 8**.

According to an embodiment, along a third path **81*b*, the second DDI circuit 120*b* may receive second image data from the processor 110 through the second data receiver 121*b* and display a screen corresponding to the second image data on the second output area 142 of the display 130. According to an embodiment, the second DDI circuit 120*b* may operate in the PSR mode, when data with respect to a predefined number of consecutive frames is the same in the second image data, regardless of the first DDI circuit 120*a*. When the second DDI circuit 120*b* operates in the PSR mode, the second data receiver 121*b* may operate in a sleep mode. In this case, a screen corresponding to the second image data that is stored in the second frame buffer 122*b* and most recently obtained from the processor 110 may be displayed on the second output area 142 of the display 130 along a fourth path 82*b* illustrated in FIG. 8**.

Figure 9:
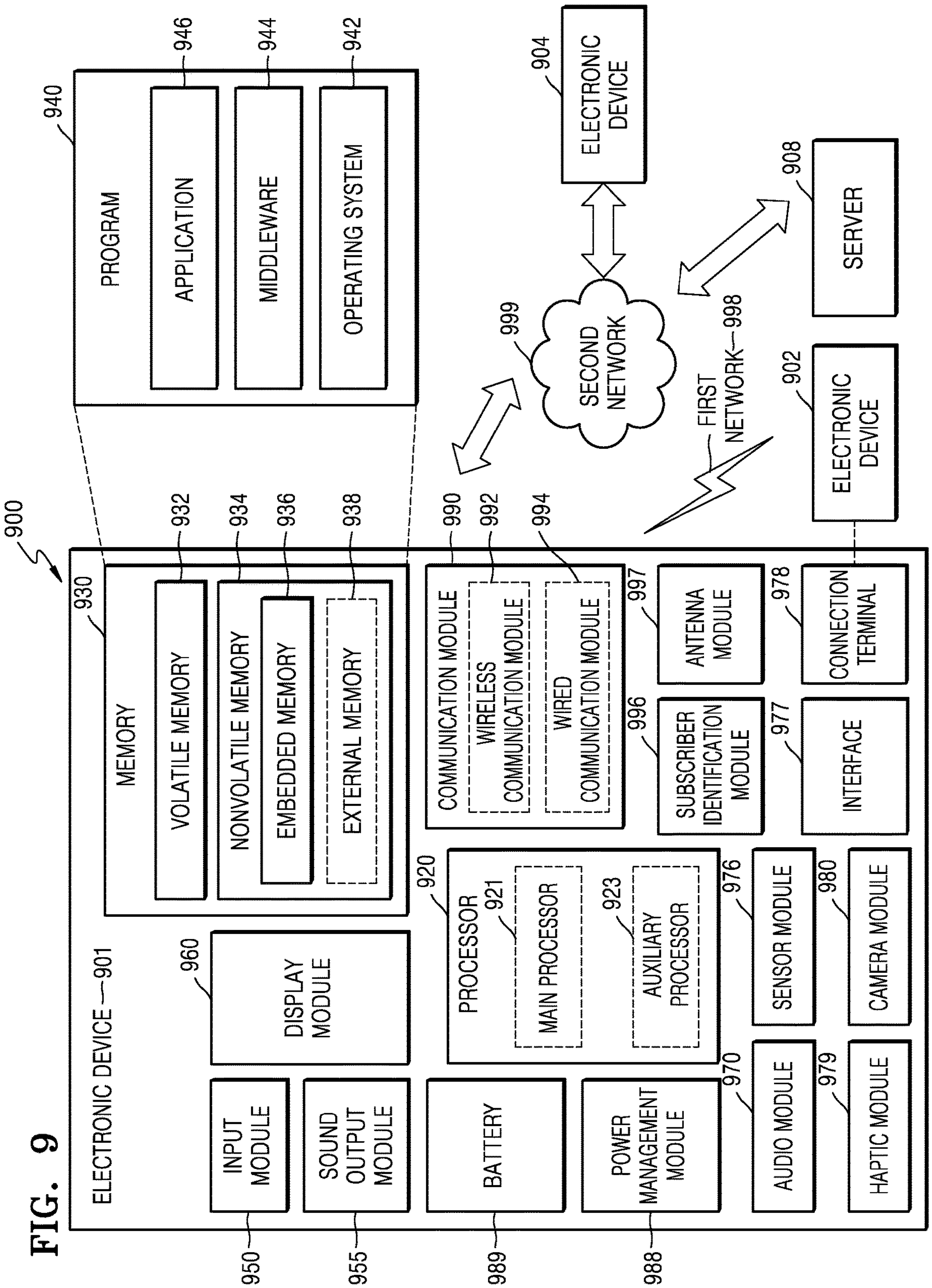
FIG. 9 is a block diagram of an electronic device in a network environment, according to an embodiment of the disclosure.

FIG. 9 is a block diagram of an electronic device in a network environment, according to an embodiment of the disclosure.

Referring to FIG. 9, in a network environment 900, an electronic device 901 may communicate with an electronic device 902 through a first network 998 (e.g., a short-range wireless communication network) or may communicate with at least one of an electronic device 904 or a server 908 through a second network 999 (e.g., a remote wireless communication network). According to an embodiment, the electronic device 901 may communicate with the electronic device 904 through the server 908. According to an embodiment, the electronic device 901 may include a processor 920, a memory 930, an input module 950, a sound output module 955, a display module 960, an audio module 970, a sensor module 976, an interface 977, a connection terminal 978, a haptic module 979, a camera module 980, a power management module 988, a battery 989, a communication module 990, a subscriber identification module 996, or an antenna module 997. According to some embodiments, the electronic device 901 may omit at least one (e.g., the connection terminal 978) of the components or may further include at least another component. According to some embodiments, one or more (e.g., the sensor module 976, the camera module 980, or the antenna module 997) of the components may be integrated into one component (e.g., the display module 960).

The processor 920 may, for example, execute software (e.g., a program 940) to control at least another component (e.g., a hardware or software component) of the electronic device 901 connected to the processor 920 and to perform various data processing or calculation operations. According to an embodiment, as at least part of the data processing or calculation operations, the processor 920 may store an instruction or data received from other components (e.g., the sensor module 976 or the communication module 990) in a volatile memory 932, process the instruction or data stored in the volatile memory 932, and store resultant data in a nonvolatile memory 934. According to an embodiment, the processor 920 may include a main processor 921 (e.g., a CPU or an AP) or an auxiliary processor 923 (e.g., a GPU, an NPU, an image signal processor, a sensor hub processor, or a communication processor) which may separately operate from the main processor 921 or together operate with the main processor 921. For example, when the electronic device 901 includes the main processor 921 and the auxiliary processor 923, the auxiliary processor 923 may use less power than the main processor 921 or may be configured to be specialized in a predefined function. The auxiliary processor 923 may be realized separately from or as part of the main processor 921.

For example, the auxiliary processor 923 may control at least some of functions or states related to at least one component (e.g., the display module 960, the sensor module 976, or the communication module 990) of the electronic device 901, on behalf of the main processor 921 when the main processor 921 is in an inactive (e.g., sleep) state or together with the main processor 921 when the main processor 921 in an active (e.g., application execution) state. According to an embodiment, the auxiliary processor 923 (e.g., an image signal processor or a communication processor) may be realized as part of other functionally related components (e.g., the camera module 980 or the communication module 990). According to an embodiment, the auxiliary processor 923 (e.g., an NPU) may include a hardware structure specialized in processing an artificial intelligence (AI) model. The AI model may be generated through machine learning. The machine learning may be performed for example directly by the electronic device 901 executing the AI model or by an additional server (e.g., the server 908). A learning algorithm may include, for example, supervised learning, unsupervised learning, semi-supervised learning, or reinforcement learning. However, the learning algorithm is not limited to the example described above. The AI model may include a plurality of artificial neural network layers. The artificial neural network may include a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or one of combinations including two or more described above, but is not limited thereto. The AI model may additionally or alternatively include a software structure as well as a hardware structure.

The memory 930 may store various data used by at least one component (e.g., the processor 920 or the sensor module 976) of the electronic device 901. For example, the data may include software (e.g., the program 940) and input data or output data with respect to an instruction with respect to the software. The memory 930 may include the volatile memory 932 or the nonvolatile memory 934.

The program 940 may be stored in the memory 930 as the software and, for example, may include an operating system 942, middleware 944, or an application 946.

The input module 950 may receive an instruction or data to be used with respect to the component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output a sound signal to the outside of the electronic device 901. The sound output module 955 may include, for example, a speaker or a receiver. The speaker may be used for general purposes, such as multimedia reproduction or recording reproduction. The receiver may be used to receive an incoming call. According to an embodiment, the receiver may be realized separately from the speaker or as part of the speaker.

The display module 960 may visually provide information to the outside (e.g., a user) of the electronic device 901. The display module 960 may include, for example, a display, a hologram device, or a control circuit configured to control a projector and a corresponding device. According to an embodiment, the display module 960 may include a touch sensor configured to sense a touch input or a pressure sensor configured to measure an intensity of a force generated by the touch input.

The audio module 970 may convert sound into an electrical signal or inversely, an electric signal into sound. According to an embodiment, the audio module 970 may obtain sound through the input module 950 or may output sound through the sound output module 955 or an external electronic device (e.g., the electronic device 902 (e.g., a speaker or a headphone) directly or wirelessly connected to the electronic device 901.

The sensor module 976 may sense an operating state (e.g., a power supply or temperature) of the electronic device 901 or an external environmental state (e.g., a user state) and may generate an electrical signal or a data value corresponding to the sensed state. According to an embodiment, the sensor module 976 may include, for example, a gesture sensor, a gyro sensor, an atmospheric sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more predefined protocols which may be used for the electronic device 901 to be directly or wirelessly connected to an external electronic device (e.g., the electronic device 902). According to an embodiment, the interface 977 may include, for example, a high definition multimedia interface (HDMI), a universal serial bus (USB) interface, an SD card interface, or an audio interface.

The connection terminal 978 may include a connector through which the electronic device 901 may be physically connected to an external electronic device (e.g., the electronic device 902). According to an embodiment, the connection terminal 978 may include, for example, an HDMI connector, a USB connector, an SD card connector, or an audio connector (e.g., a headphone connector).

The haptic module 979 may convert an electrical signal to a mechanical stimulus (e.g., vibration or motion) or an electrical stimulus which may be recognized by a user through a tactile sense or a kinesthetic sense. According to an embodiment, the haptic module 979 may include, for example, a motor, a piezoelectric device, or an electrical stimulus device.

The camera module 980 may capture a still image or a motion image. According to an embodiment, the camera module 980 may include one or more lenses, image sensors, image signal processors, or flashes.

The power management module 988 may manage a power supply provided to the electronic device 901. According to an embodiment, the power management module 988 may be realized, for example, as at least part of a power management integrated circuit (PMIC).

The battery 989 may supply power to at least one component of the electronic device 901. According to an embodiment, the battery 989 may include, for example, a non-rechargeable primary battery, a rechargeable secondary battery, or a fuel battery.

The communication module 990 may support establishment of a direct (e.g., wired) communication channel or a wireless communication channel between the electronic device 901 and an external electronic device (e.g., the electronic device 902, the electronic device 904, or the server 908) and execution of communication through the established communication channel. The communication module 990 may be independently operated from the processor 920 (e.g., an AP) and may include one or more communication processors supporting direct (e.g., wired) communication or wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication module). A corresponding one of these communication modules may communicate with the external electronic device 904 through the first network 998 (e.g., a short-range wireless communication network, such as Bluetooth, wireless fidelity (Wi-fi) direct, or infrared data association (IrDA)) or the second network 999 (e.g., a remote communication network, such as a legacy cellular network, a fifth generation (5G) network, a next-generation communication network, the Internet, or a computer network (e.g., a LAN or a wide area network (WAN))). Various types of these communication modules may be integrated into one component (e.g., a single chip) or may be realized as a plurality of different components (e.g., a plurality of chips). The wireless communication module 992 may identify or authenticate the electronic device 901 in a communication network such as the first network 998 or the second network 999, by using subscriber information (e.g., an international mobile subscriber identity (IMSI)) stored in the subscriber identification module 996.

The wireless communication module 992 may support a 5G network after a fourth generation (4G) network and next-generation communication technology, for example, new radio (NR) access technology. The NR access technology may support high speed transmission of high capacity data (enhanced mobile broadband (eMBB)), terminal power consumption minimization and access of a plurality of terminals (massive machine-type communications (mMTC)), or a high reliability and a low latency (ultra-reliable and low latency communications (URLLC)). The wireless communication module 992 may support, for example, a high-frequency band (e.g., an millimeter wave (mmWave) band) for realizing a high data transmission rate. The wireless communication module 992 may support various techniques for securing the performance in a high-frequency band, for example, beamforming, massive multiple-input and multiple-output (MIMO), full dimensional MIMO (FD-MIMO), an array antenna, analog beamforming, or a large scale antenna. The wireless communication module 992 may support various requirements defined in the electronic device 901, an external electronic device (e.g., the electronic device 904), or a network system (e.g., the second network 999). According to an embodiment, the wireless communication module 992 may support a peak data rate (e.g., 20 gigabits per second (Gbps) or higher) for realizing the eMBB, a loss coverage (e.g., 164 decibels (dB) or lower) for realizing the mMTC, or a U-plane latency (e.g., a downlink (DL) and an uplink (UL) of 0.5 milliseconds (ms) or lower or round-trip 1 ms or lower, respectively).

The antenna module 997 may transmit a signal or a power supply to the outside (e.g., an external electronic device) or receive the signal or the power supply from the outside. According to an embodiment, the antenna module 997 may include an antenna including an emitter formed of a conductor or a conductive pattern formed above a substrate (e.g., a printed circuit board (PCB)). According to an embodiment, the antenna module 997 may include a plurality of antennas (e.g., an array antenna). In this case, at least one antenna appropriate for a communication method used in a communication network such as the first network 998 or the second network 999 may be, for example, selected by the communication module 990 from among the plurality of antennas. A signal or a power supply may be transmitted or received between the communication module 990 and the external electronic device through the selected at least one antenna. According to some embodiments, other components (e.g., a radio frequency integrated circuit (RFID)) in addition to the emitter may be additionally formed as part of the antenna module 997.

According to various embodiments, the antenna module 997 may form an mmWave antenna module. According to an embodiment, the mmWave antenna module may include a PCB, an RFIC arranged on a first surface (e.g., a lower surface) of the PCB or to be adjacent thereto and capable of supporting a pre-defined high-frequency band (e.g., an mmWave band), and a plurality of antennas (e.g., an array antenna) arranged on a second surface (e.g., an upper surface or a side surface) of the PCB or to be adjacent thereto and capable of transmitting or receiving a signal of the pre-defined high frequency band.

One or more of the components described above may be connected to each other and may exchange signals (e.g., instructions or data) with each other through a communication method between peripheral devices (e.g., a bus, general purpose input and output (GPIO), a serial peripheral interface (SPI), or a mobile industry processor interface (MIPI)).

According to an embodiment, the instructions or data may be transmitted or received between the electronic device 901 and the external electronic device 904 through the server 908 connected to the second network 999. Each of the external electronic devices 902 and 905 may be the same type of device as the electronic device 901 or a different type of device from the electronic device 901. According to an embodiment, the whole or part of operations executed in the electronic device 901 may be executed in one or more external electronic devices from among the external electronic devices 902, 904, and 908. For example, when the electronic device 901 has to execute a certain function or service automatically or in response to a request by a user or another device, the electronic device 901 may not directly execute the function or service but may request one or more external electronic devices to execute at least a portion of the function or service, or the electronic device 901 may directly execute the function or service and may additionally request one or more external electronic devices to execute at least a portion of the function or service. The one or more external electronic devices receiving the request may execute the requested at least the portion of the function or service or an additional function or service related to the request and may transmit a result of the execution to the electronic device 901. The electronic device 901 may directly provide the result as at least a portion of a response to the request or may provide the result by additionally processing the result. To this end, for example, a cloud computing technique, a distributed computing technique, a mobile edge computing (MEC) technique, or a client-server computing technique may be used. For example, the electronic device 901 may provide an ultra-low latency service by using the distributed computing technique or the MEC technique. According to another embodiment, the external electronic device 904 may include an Internet of things (IoT) device. The server 908 may be an intelligence server using machine learning and/or a neural network. According to an embodiment, the external electronic device 904 or the server 908 may be included in the second network 999. The electronic device 901 may be implemented in intelligence services (e.g., a smart home, a smart city, a smart car, or a health care), based on the 5G communication technology and the IoT-related technology.

Figure 10:
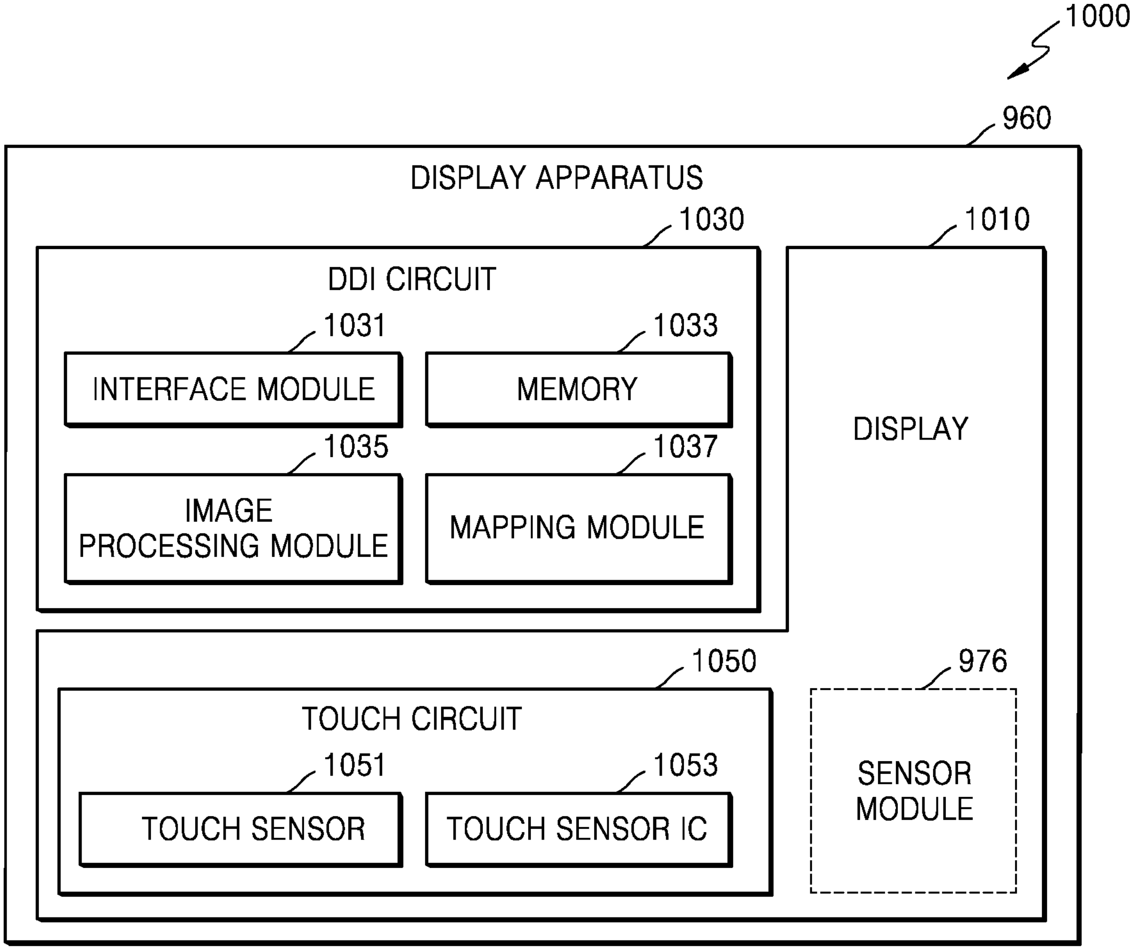
FIG. 10 is a block diagram of a display module according to an embodiment of the disclosure.

FIG. 10 is a block diagram of a display module according to an embodiment of the disclosure.

Referring to FIG. 10 depicting a block diagram 1000, a display module 960 may include a display 1010 and a DDI circuit 1030 configured to control the display 1010. The DDI circuit 1030 may include an interface module 1031, a memory 1033 (e.g., a buffer memory), an image processing module 1035, or a mapping module 1037. The DDI circuit 1030 may receive image information including, for example, image data or an image control signal corresponding to an instruction to control the image data from other components of the electronic device 901 through the interface module 1031. For example, according to an embodiment, the image information may be received from the processor 920 (e.g., the main processor 921) (e.g., an AP processor) or the auxiliary processor 923 (e.g., a GPU) operated independently from a function of the main processor 921. The DDI circuit 1030 may communicate with a touch circuit 1050, the sensor module 976, or the like through the interface module 1031. Also, the DDI circuit 1030 may store at least a portion of the received image information in the memory 1033, for example, in a frame unit. The image processing module 1035 may perform, for example, pre- or post-processing (e.g., resolution, brightness, or size adjusting) on at least a portion of the image data based on at least the characteristic of the image data or the characteristic of the display 1010. The mapping module 1037 may generate a voltage value or a current value corresponding to the image data pre- or post-processed through the image processing module 935. According to an embodiment, the generation of the voltage value or the current value may be performed for example at least partially based on the attribute (e.g., pixel arrangements (red green blue (RGB) stripe or pentile structures) or a size of each sub-pixel) of pixels of the display 1010. At least some of the pixels of the display 1010 may be driven for example at least partially based on the voltage value or the current value, and thus, visual information (e.g., text, an image, or an icon) corresponding to the image data may be displayed through the display 1010.

According to an embodiment, the display module 960 may further include the touch circuit 1050. The touch circuit 1050 may include a touch sensor 1051 and a touch sensor integrated circuit (IC) 1053 configured to control the touch sensor 1051. The touch sensor IC 1053 may control the touch sensor 1051, for example, to sense a touch input or a hovering input with respect to a certain position of the display 1010. For example, the touch sensor IC 1053 may sense the touch input or the hovering input by measuring a change of a signal (e.g., a voltage, a light intensity, a resistance value, or a charge amount) with respect to a certain position of the display 1010. The touch sensor IC 1053 may provide information (e.g., a position, an area, pressure, or a time point) with respect to the sensed touch input or hovering input to the processor 920. According to an embodiment, at least a portion (e.g., the touch sensor IC 1053) of the touch circuit 1050 may be included as part of the DDI circuit 1030 or the display 1010 or as part of another component (e.g., the auxiliary processor 923) arranged outside the display module 960.

According to an embodiment, the display module 960 may include at least one sensor (e.g., a fingerprint sensor, an iris sensor, a pressure sensor, or an illuminance sensor) of the sensor module 976 or may further include a control circuit with respect to the at least one sensor. In this case, the at least one sensor or the control circuit with respect to the at least one sensor may be embedded in a portion (e.g., the display 1010 or the DDI circuit 1030) of the display module 960 or a portion of the touch circuit 1050. For example, when the sensor module 976 embedded in the display module 960 includes a biometric sensor (e.g., a fingerprint sensor), the biometric sensor may obtain biometric information (e.g., a fingerprint image) related to a touch input, through an area of the display 1010. As another example, when the sensor module 976 embedded in the display module 960 includes a pressure sensor, the pressure sensor may obtain pressure information related to a touch input, through an area or the entire area of the display 1010. According to an embodiment, the touch sensor 1051 or the sensor module 976 may be arranged between pixels of a pixel layer of the display 1010 or above or below the pixel layer.

According to an embodiment of the disclosure, an electronic device configured to display at least one piece of content includes: a display including an output area divided into a plurality of blocks; a display driving integrated (DDI) circuit configured to drive the display; and a processor electrically connected to the DDI circuit, wherein the processor is configured to: obtain information about a content area of the output area, the content area displaying the at least one piece of content; based on the obtained information, classify the plurality of blocks into first group blocks at least partially overlapping the content area, second group blocks not overlapping the content area and not adjacent to the first group blocks, and third group blocks positioned between the first group blocks and the second group blocks; and in order to display the at least one piece of content on the display, control the DDI circuit to drive a first area of the output area, the first area corresponding to the first group blocks, at a first driving frequency, drive a second area of the output area, the second area corresponding to the second group blocks, at a second driving frequency, and drive a third area of the output area, the third area corresponding to the third group blocks, at a third driving frequency, which is a medium frequency of the first driving frequency and the second driving frequency.

According to an embodiment, the processor may further be configured to determine an area of the third area based on a difference between the first driving frequency and the second driving frequency.

According to an embodiment, the third group blocks may include first medium blocks and second medium blocks, and the third driving frequency may include a first medium driving frequency and a second medium driving frequency. Also, the processor may further be configured to, when a difference between the first driving frequency and the second driving frequency is equal to or greater than a predefined level, control the DDI circuit to drive a first medium area of the third area, the first medium area corresponding to the first medium blocks, at the first medium driving frequency, and drive a second medium area of the third area, the second medium area corresponding to the second medium blocks, at the second medium driving frequency.

According to an embodiment, the first medium blocks may be positioned between the first group blocks and the second group blocks, and the second medium blocks may be positioned between the first medium blocks and the second group blocks. Also, the first medium driving frequency may be a medium frequency of the first driving frequency and the second driving frequency, and the second medium driving frequency may be a medium frequency of the first medium driving frequency and the second driving frequency.

According to an embodiment, the processor may further be configured to: sense a user input on the first area; and in response to the sensed user input, change the first driving frequency such that the first driving frequency becomes an integer multiple of the second driving frequency, or the second driving frequency becomes an integer multiple of the first driving frequency. According to an embodiment, the processor may further be configured to, in response to the sensed user input, change the first driving frequency and the third driving frequency such that the first driving frequency and the third driving frequency become equal to the second driving frequency.

According to an embodiment, the processor may further be configured to: sense a user input on the second area; and in response to the sensed user input, change the second driving frequency.

According to an embodiment, when the first driving frequency is greater than the second driving frequency, the third driving frequency may be greater than or equal to the second driving frequency and less than or equal to the first driving frequency, when the first driving frequency is less than the second driving frequency, the third driving frequency may be greater than or equal to the first driving frequency and less than or equal to the second driving frequency, and when the first driving frequency is equal to the second driving frequency, the third driving frequency may be equal to the first driving frequency and the second driving frequency.

According to an embodiment, the information about the content area may include at least one of information about a position of the content area, information about a size of the content area, and information with respect to a boundary of the content area.

According to an embodiment, the processor may further be configured to transmit, to the DDI circuit, image data for displaying the at least one piece of content and information with respect to the first group blocks, the second group blocks, the third group blocks, the first driving frequency, the second driving frequency, and the third driving frequency.

According to an embodiment, the image data may be compressed by a codec having a predefined size, and a size of each of the plurality of blocks may be determined based on the predefined size of the codec.

According to an embodiment, the processor may further be configured to transmit the image data to the DDI circuit, based on a higher frequency of the first driving frequency and the second driving frequency.

According to an embodiment, data of the image data, the data corresponding to a first frame to drive one or more of the first area, the second area, and the third area, may not include data corresponding to areas other than the one or more of the first area, the second area, and the third area.

According to an embodiment, data of the image data, the data corresponding to a first frame to drive one or more of the first area, the second area, and the third area, may include masking-processed data with respect to areas other than the one or more of the first area, the second area, and the third area.

According to an embodiment, when data with respect to a predefined number of consecutive frames of the image data is the same, the DDI circuit may operate in a panel self-refresh (PSR) mode.

According to an embodiment, when data with respect to a predefined number of consecutive frames of the image data is the same with respect to at least one or more of the first area, the second area, and the third area, the DDI circuit may operate in a PSR mode with respect to the one or more of the first area, the second area, and the third area.

According to an embodiment, the DDI circuit may include a first DDI circuit configured to drive a first output area of the output area and a second DDI circuit configured to drive a second output area of the output area, and when data with respect to a predefined number of consecutive frames is the same with respect to first image data with respect to the first output area of the image data, the first DDI circuit may operate in a PSR mode.

Also, according to an embodiment of the disclosure, a method, performed by an electronic device, of displaying at least one piece of content includes: obtaining information about a content area of an output area of a display, the content area displaying the at least one piece of content, wherein the output area is divided into a plurality of blocks; based on the obtained information, classifying the plurality of blocks into first group blocks at least partially overlapping the content area, second group blocks not overlapping the content area and not adjacent to the first group blocks, and third group blocks positioned between the first group blocks and the second group blocks; and in order to display the at least one piece of content on the display, controlling a display driving integrated (DDI) circuit to drive a first area of the output area, the first area corresponding to the first group blocks, at a first driving frequency, drive a second area of the output area, the second area corresponding to the second group blocks, at a second driving frequency, and drive a third area of the output area, the third area corresponding to the third group blocks, at a third driving frequency, which is a medium frequency of the first driving frequency and the second driving frequency.

The electronic device according to various embodiments of the disclosure may include various types of devices. The electronic device may include, for example, a portable communication device (e.g., a smartphone), a computer device, a portable multimedia device, a portable medical device, a camera, a wearable device, or a home appliance. The electronic device according to the embodiments of the disclosure is not limited to the devices described above.

Various embodiments of the disclosure and terms used herein are not intended to limit the technical features described in this specification to particular embodiments, and it should be understood that various modifications, equivalents, or substitutes of the corresponding embodiments are also included in the technical features. In this disclosure, each of expressions such as "A or B," "at least one of A and B," "at least one of A or B," "A, B, or C," "at least one of A, B, and C," and "at least one of A, B, or C" may include any one of items listed together with the corresponding expression or all possible combinations of the same. Terms such as "1$^{st}$", "2$^{nd}$", "first," and "second" may be merely used to distinguish a corresponding component from other corresponding components and do not limit the corresponding components in terms of other aspects (for example, the degree of importance or the order). When a certain (for example, a first) element is referred to as being "coupled" or "connected" to another (for example, a second) element with the term "functionally" or "communicatively" or without this term, it denotes that the element may be connected to the other element directly (for example, in a wired manner), wirelessly, or through a third element.

The term "module" used in various embodiments of the disclosure may include a unit realized as hardware, software, or firmware, and for example, may be interchangeably used with terms such as "logic," "logic block," "component," or "circuit." The module may include an integrally formed component or a smallest unit or part of the component configured to execute one or more functions. For example, according to an embodiment, the module may be realized in the form of an application-specific integrated circuit (ASIC).

Various embodiments of the disclosure may be realized as software (e.g., the program 940) including one or more instructions stored in a machine (e.g., the electronic device 901)-readable storage medium (e.g., an embedded memory 936 or an external memory 938). For example, a processor (e.g., the processor 920) of a machine (e.g., the electronic device 901) may call at least one instruction from among one or more instructions stored in the storage medium and may execute the instruction. This may allow the machine to operate to execute at least one function according to the called at least one instruction. The one or more instructions may include a code generated by a compiler or a code executable by an interpreter. The machine-readable storage medium may be provided in the form of a non-transitory storage medium. Here, the term "non-transitory" only denotes that a storage medium is a tangible device and does not include a signal (e.g., an electromagnetic wave), and the term does not distinguish a case where data is semi-permanently stored in the storage medium and a case where data is temporarily stored in the storage medium from each other.

According to an embodiment, the method according to various embodiments disclosed in the specification may be provided as an inclusion of a computer program product. The computer program product may be, as a product, transacted between a seller and a purchaser. The computer program product may be distributed in the form of a machine-readable storage medium (e.g., a compact disc (CD)-ROM) or may be distributed directly between two user devices (e.g., smartphones) or online (e.g., downloaded or uploaded) through an application store (e.g., Play Store™). In the case of online distribution, at least a portion of the computer program product may be at least temporarily stored in a machine-readable storage medium, such as a server of a manufacturer, a server of an application store, or a memory of a relaying server, or may be temporarily generated.

According to various embodiments, each (e.g., a module or a program) of the elements described above may include a singular or plural entities, and some of the plural entities may be separately arranged in other elements. According to various embodiments, one or more elements or operations of the elements described above may be omitted, or one or more elements or operations of the elements described above may be added. Alternatively or additionally, a plurality of elements (e.g., modules or programs) may be integrated into one element. In this case, the integrated element may perform one or more functions of each of the plurality of elements in the same or substantially the same manner as a corresponding element of the plurality of elements before the integration. According to various embodiments, operations performed by a module, a program, or other elements may be sequentially, parallelly, repetitively, or heuristically performed; one or more of the operations may be performed in a different order or omitted; or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device configured to display at least one piece of content, the electronic device comprising:

a display including an output area divided into a plurality of blocks;

a display driving integrated (DDI) circuit configured to drive the display; and a processor electrically connected to the DDI circuit, wherein the processor is configured to:

obtain information about a content area of the output area, the content area displaying the at least one piece of content, based on the obtained information, classify the plurality of blocks into first group blocks at least partially overlapping the content area, second group blocks not overlapping the content area and not adjacent to the first group blocks, and third group blocks positioned between the first group blocks and the second group blocks, and in order to display the at least one piece of content on the display, control the DDI circuit to drive a first area of the output area, the first area corresponding to the first group blocks, at a first driving frequency, drive a second area of the output area, the second area corresponding to the second group blocks, at a second driving frequency, and drive a third area of the output area, the third area corresponding to the third group blocks, at a third driving frequency, which is a medium frequency of the first driving frequency and the second driving frequency.

2. The electronic device of claim 1, wherein the processor is further configured to determine an area of the third area based on a difference between the first driving frequency and the second driving frequency.

3. The electronic device of claim 1, wherein the third group blocks include first medium blocks and second medium blocks, and the third driving frequency includes a first medium driving frequency and a second medium driving frequency, and wherein the processor is further configured to, in response to a difference between the first driving frequency and the second driving frequency being equal to or greater than a predefined level, control the DDI circuit to drive a first medium area of the third area, the first medium area corresponding to the first medium blocks, at the first medium driving frequency, and drive a second medium area of the third area, the second medium area corresponding to the second medium blocks, at the second medium driving frequency.

4. The electronic device of claim 3, wherein the first medium blocks are positioned between the first group blocks and the second group blocks, and the second medium blocks are positioned between the first medium blocks and the second group blocks, and wherein the first medium driving frequency is the medium frequency of the first driving frequency and the second driving frequency, and the second medium driving frequency is a medium frequency of the first medium driving frequency and the second driving frequency.

5. The electronic device of claim 1, wherein the processor is further configured to:

sense a user input on the first area; and in response to the sensed user input, change the first driving frequency such that the first driving frequency becomes an integer multiple of the second driving frequency, or the second driving frequency becomes an integer multiple of the first driving frequency.

6. The electronic device of claim 5, wherein the processor is further configured to, in response to the sensed user input, change the first driving frequency and the third driving frequency such that the first driving frequency and the third driving frequency become equal to the second driving frequency.

7. The electronic device of claim 1, wherein the processor is further configured to:

sense a user input on the second area; and in response to the sensed user input, change the second driving frequency.

8. The electronic device of claim 1, wherein, in response to the first driving frequency being greater than the second driving frequency, the third driving frequency is greater than or equal to the second driving frequency and less than or equal to the first driving frequency, wherein in response to the first driving frequency being less than the second driving frequency, the third driving frequency is greater than or equal to the first driving frequency and less than or equal to the second driving frequency, and wherein in response to the first driving frequency being equal to the second driving frequency, the third driving frequency is equal to the first driving frequency and the second driving frequency.

9. The electronic device of claim 1, wherein the information about the content area includes at least one of information about a position of the content area, information about a size of the content area, and information with respect to a boundary of the content area.

10. The electronic device of claim 1, wherein the processor is further configured to transmit, to the DDI circuit, image data for displaying the at least one piece of content and information with respect to the first group blocks, the second group blocks, the third group blocks, the first driving frequency, the second driving frequency, and the third driving frequency.

11. The electronic device of claim 10, wherein the image data is compressed by a codec having a predefined size, and wherein a size of each of the plurality of blocks is determined based on the predefined size of the codec.

12. The electronic device of claim 10, wherein the processor is further configured to transmit the image data to the DDI circuit, based on a higher frequency of the first driving frequency and the second driving frequency.

13. The electronic device of claim 10, wherein data of the image data, the data corresponding to a first frame to drive one or more of the first area, the second area, and the third area, does not include data corresponding to areas other than the one or more of the first area, the second area, and the third area.

14. The electronic device of claim 10, wherein data of the image data, the data corresponding to a first frame to drive one or more of the first area, the second area, and the third area, includes masking-processed data with respect to areas other than the one or more of the first area, the second area, and the third area.

15. The electronic device of claim 10, wherein, when data with respect to a predefined number of consecutive frames of the image data is the same, the DDI circuit operates in a panel self-refresh (PSR) mode.

16. The electronic device of claim 10, wherein, in response to data with respect to a predefined number of consecutive frames of the image data being the same with respect to at least one or more of the first area, the second area, and the third area, the DDI circuit operates in a panel self-refresh (PSR) mode with respect to the one or more of the first area, the second area, and the third area.

17. The electronic device of claim 10, wherein the DDI circuit comprises a first DDI circuit configured to drive a first output area of the output area and a second DDI circuit configured to drive a second output area of the output area, and wherein in response to data with respect to a predefined number of consecutive frames being the same with respect to first image data with respect to the first output area of the image data, the first DDI circuit operates in a PSR mode.

18. A method, performed by an electronic device, of displaying at least one piece of content, the method comprising:

obtaining information about a content area of an output area of a display, the content area displaying the at least one piece of content, wherein the output area is divided into a plurality of blocks;

based on the obtained information, classifying the plurality of blocks into first group blocks at least partially overlapping the content area, second group blocks not overlapping the content area and not adjacent to the first group blocks, and third group blocks positioned between the first group blocks and the second group blocks; and in order to display the at least one piece of content on the display, controlling a display driving integrated (DDI) circuit to drive a first area of the output area, the first area corresponding to the first group blocks, at a first driving frequency, drive a second area of the output area, the second area corresponding to the second group blocks, at a second driving frequency, and drive a third area of the output area, the third area corresponding to the third group blocks, at a third driving frequency, which is a medium frequency of the first driving frequency and the second driving frequency.

19. The method of claim 18, further comprising determining an area of the third area based on a difference between the first driving frequency and the second driving frequency.

20. The method of claim 18, wherein the third group blocks include first medium blocks and second medium blocks, and the third driving frequency includes a first medium driving frequency and a second medium driving frequency, the first medium blocks are positioned between the first group blocks and the second group blocks, and the second medium blocks are positioned between the first medium blocks and the second group blocks, and the first medium driving frequency is the medium frequency of the first driving frequency and the second driving frequency, and the second medium driving frequency is a medium frequency of the first medium driving frequency and the second driving frequency, the method further comprising, when a difference between the first driving frequency and the second driving frequency is equal to or greater than a pre-defined level, controlling the DDI circuit to drive a first medium area of the third area, the first medium area corresponding to the first medium blocks, at the first medium driving frequency, and drive a second medium area of the third area, the second medium area corresponding to the second medium blocks, at the second medium driving frequency.

* * * * *